(12) United States Patent
Tatsuhara et al.

(10) Patent No.: US 8,771,629 B2
(45) Date of Patent: Jul. 8, 2014

(54) NANO-CARBON MATERIAL PRODUCTION APPARATUS AND METHOD

(75) Inventors: Kiyoshi Tatsuhara, Nagasaki-ken (JP); Tomoaki Sugiyama, Nagasaki-ken (JP); Atsushi Tanaka, Nagasaki-ken (JP); Toshihiko Setoguchi, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 417 days.

(21) Appl. No.: 12/991,197

(22) PCT Filed: May 28, 2009

(86) PCT No.: PCT/JP2009/059820
§ 371 (c)(1),
(2), (4) Date: Nov. 5, 2010

(87) PCT Pub. No.: WO2009/145281
PCT Pub. Date: Dec. 3, 2009

(65) Prior Publication Data
US 2011/0060162 A1    Mar. 10, 2011

(30) Foreign Application Priority Data

| May 30, 2008 | (JP) | 2008-143698 |
| Jun. 17, 2008 | (JP) | 2008-158360 |
| Jun. 17, 2008 | (JP) | 2008-158361 |
| Jul. 3, 2008 | (JP) | 2008-174825 |
| Aug. 20, 2008 | (JP) | 2008-212224 |
| Oct. 3, 2008 | (JP) | 2008-258877 |
| Nov. 14, 2008 | (JP) | 2008-292750 |

(51) Int. Cl.
| D01F 9/127 | (2006.01) |
| C07J 51/00 | (2006.01) |
| B01J 8/18 | (2006.01) |
| B01J 8/00 | (2006.01) |
| C07C 45/00 | (2006.01) |
| C07C 41/01 | (2006.01) |
| B82Y 40/00 | (2011.01) |

(52) U.S. Cl.
USPC ........ 423/447.3; 562/498; 422/139; 422/145; 422/211; 568/338; 568/665; 568/817; 977/847

(58) Field of Classification Search
USPC ........ 423/447.1–447.3, 445 B; 977/742–754, 977/842–848; 562/498; 422/139, 145, 211; 568/338, 665, 817
See application file for complete search history.

(56) References Cited

U.S. PATENT DOCUMENTS

2006/0014375 A1* 1/2006 Ford et al. ................. 438/622

FOREIGN PATENT DOCUMENTS

| JP | 06280116 A | 10/1994 |
| JP | 3100962 B1 | 8/2000 |

(Continued)

OTHER PUBLICATIONS

Machine Translation of JP 2008-37695.*

(Continued)

*Primary Examiner* — Daniel C McCracken
(74) *Attorney, Agent, or Firm* — Lowe Hauptman & Ham, LLP

(57) ABSTRACT

Included are a nano-carbon material production unit for producing a nano-carbon material using a fluidized catalyst formed by granulating a carrier supporting an active component, an acid treatment unit for dissolving and separating a catalyst by an acid solution by feeding a catalyst-containing nano-carbon material into the acid solution, and a pH adjustment unit, which is an anti-agglomeration treatment unit, provided on a downstream side of the acid treatment unit, for performing an anti-agglomeration treatment to prevent agglomeration among nano-carbons due to repulsion caused by dissociation among oxygen-containing functional groups added to the nano-carbon material.

9 Claims, 38 Drawing Sheets

(56) References Cited

FOREIGN PATENT DOCUMENTS

| JP | 2001139317 | A |   | 5/2001  |           |
|----|------------|---|---|---------|-----------|
| JP | 2001520615 | A |   | 10/2001 |           |
| JP | 2003-300716|   | * | 10/2003 |           |
| JP | 2003300716 | A |   | 10/2003 |           |
| JP | 2004076197 | A |   | 3/2004  |           |
| JP | 2005-97029 |   | * | 4/2005  | C01B 31/02|
| JP | 200597029  |   |   | 4/2005  |           |
| JP | 2005-97029 |   | * | 5/2005  |           |
| JP | 2005-220245|   | * | 5/2005  |           |
| JP | 2005220245 | A |   | 8/2005  |           |
| JP | 2006225246 | A |   | 8/2006  |           |
| JP | 2006-231198|   | * | 9/2006  |           |
| JP | 2006231198 | A |   | 9/2006  |           |
| JP | 2007015109 | A |   | 1/2007  |           |
| JP | 2007297255 | A |   | 11/2007 |           |
| JP | 2008-37695 |   | * | 2/2008  | C01B 31/02|
| JP | 200837695  | A |   | 2/2008  |           |
| JP | 2008037694 | A |   | 2/2008  |           |
| JP | 2008037696 | A |   | 2/2008  |           |
| JP | 2008-56765 |   | * | 3/2008  |           |
| JP | 2008-056765|   | * | 3/2008  | C08L 101/12|
| JP | 200856765  | A |   | 3/2008  |           |
| JP | 2006225246 | A |   | 1/2011  |           |
| WO | 9709272    | A1|   | 3/1997  |           |

OTHER PUBLICATIONS

Machine Translation of JP 2005-97029.*
Machine Translation of JP 2008-56765.*
Machine Translation of JP 2003-300716.*
Machine Translation of JP 2005-220245.*
Machine Translation of JP 2006-231198.*
Machine translation of JP 2008-37695 to Sugiyama, et al. (Mitsubishi Heavy Ind. Ltd., published Feb. 21, 2008; C01B 31/02).*
Machine tranlsation of JP 2005-97029 to Koseki, et al. (Toray lnudstries, Inc., published Apr. 14, 2005; C01B 31/02).*
Machine translation of JP 2008-056765 to Saito (Mitsubish Rayon Co, Ltd., published Mar. 13, 2008; C08L 101/12).*
ISR for PCT/JP2009/059820 mailed Aug. 11, 2009.
Junya Suehiro et al.,"Development of Water-Solubilization Technique of Carbon Nanotube by Underwater Microplasma", [ online ] <URL:http://hv.ees.kyushu-u.ac.jp/Lab-j/index.hyml>.
Yuki Kato et al. "Effects of solution pH on solubilization efficiency of carbon nanotubes using streamer discharge in water" National Conference of IEEJ.
Yusuke Kanatake et al. "Dispersion of multi-walled carbon nanotubes by pulsed streamer discharge in the suspension of carbon nanotubes" IEEJ papers of discharge, ED. Issued Jan. 26, 2006.
Sumio Iijima "Helical microtubules of graphitic carbon" Nature, vol. 354, p. 56-58. Issued Nov. 7, 1991.
Written Opinion of International Searching Authority for PCT/JP2009/059820.
Junya Suehiro et al.,"Development of Water-Solubilization Technique of Carbon Nanotube by Underwater Microplasma", [ online ] <URL:http://hv.ees.kyushu-u.ac.jp/Lab-j/index.html>, May 20, 2008.
Yuki Kato et al. "Effects of solution pH on solubilization efficiency of carbon nanotubes using streamer discharge in water" National Conference of IEEJ, Mar. 20, 2008.
Korean Notice of Allowance for Application No. 10-2010-7026600 mailed Nov. 26, 2012.
Office Action corresponding to KR 2010-7026600, dated May 23, 2012.
Decision of Patent Grant mailed May 14, 2013 corresponds to Japanese patent application No. 2010-514542.

* cited by examiner

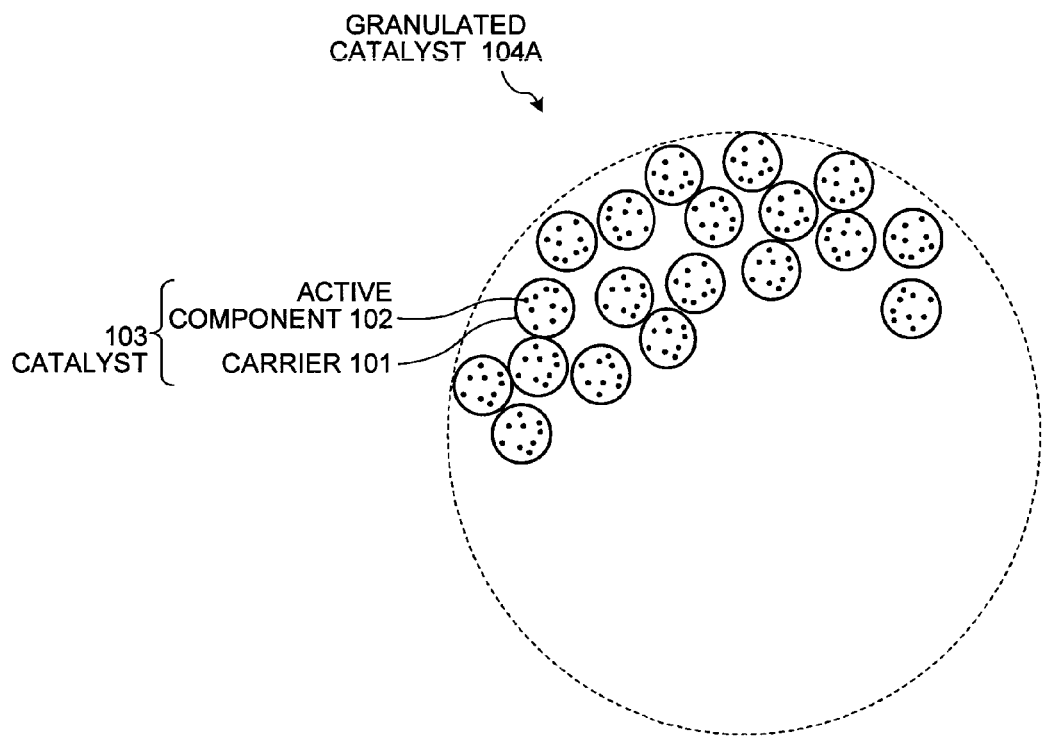
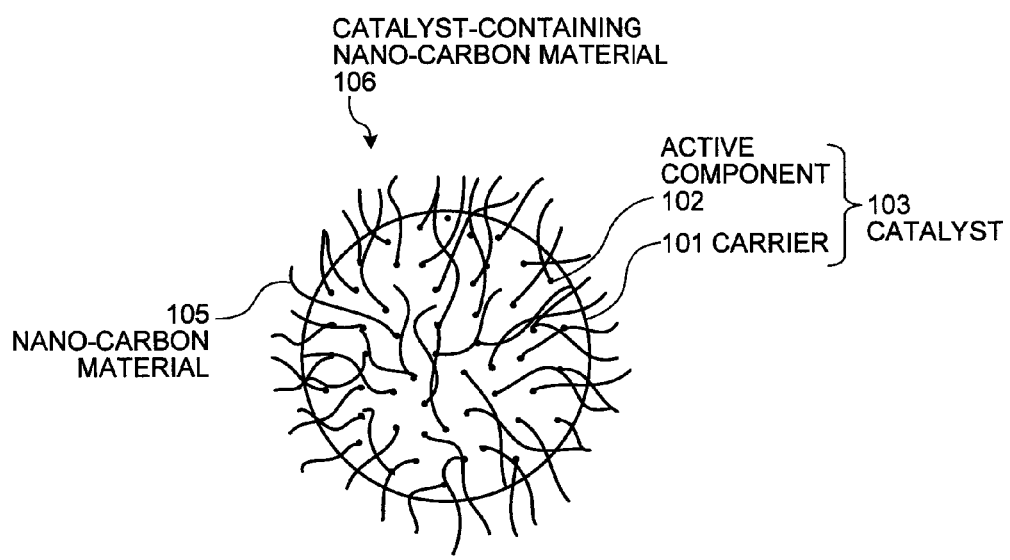

ns. Thus,
in this method, it is difficult to produce single-walled nanotubes having a comparatively even diameter and length at a high yield.

NANO-CARBON MATERIAL PRODUCTION APPARATUS AND METHOD

RELATED APPLICATIONS

This application is a national phase of PCT/JP2009/059820 filed May 28, 2009 and claims priority from, Japanese Application Numbers 2008-143698 filed May 30, 2008, 2008-158360 filed Jun. 17, 2008, 2008-158361 filed Jun. 17, 2008, 2008-174825 filed Jul. 3, 2008, 2008-212224 filed Aug. 20, 2008, 2008-258877 filed Oct. 3, 2008, and 2008-292750 filed Nov. 14, 2008.

TECHNICAL FIELD

The present invention relates to a nano-carbon material production apparatus, and a nano-carbon production method, having an improved effective nano-carbon material yield.

BACKGROUND ART

Carbon nanotubes are tubular carbon polyhedra having a structure in which a graphite sheet is formed in a closed cylindrical shape. Examples of these carbon nanotubes include multi-walled nanotubes having a multi-walled structure in which a graphite sheet is formed in a closed cylindrical shape, and single-walled nanotubes having a single-walled structure in which a graphite sheet is formed in a closed cylindrical shape.

Multi-walled nanotubes were discovered in 1991 by Iijima. More specifically, multi-walled nanotubes were discovered to exist in a mass of carbon deposited on the cathode in an arc discharge method (Non-Patent Document 1). Subsequently, multi-walled nanotube research was actively pursued, so that it is now possible to synthesize multi-walled nanotubes in large quantities.

On the other hand, single-walled nanotubes have an inner diameter of roughly about 0.4 to 10 nanometers (nm). Synthesis of single-walled nanotubes was simultaneously reported by Iijima and an IBM group in 1993. The electron state of single-walled nanotubes has been theoretically predicted, and the electron physical properties are thought to change from a metallic nature to a semiconductor-like nature due to a helical rolled arrangement. Therefore, single-walled nanotubes hold promise as a future electronic material.

Examples of other single-walled nanotubes applications include as a conductive composite material, a nano-electronic material, a field electron emission emitter, a high directivity radiation source, a soft X-ray source, a one-dimensional conducting material, a highly heat-conductive material, a hydrogen storage material and the like. Moreover, it is believed that the addition of functional groups to the surface, metal coating, and enclosure of foreign substances will lead to further expansion of single-walled nanotube applications.

Conventionally, the above-described single-walled nanotubes are produced by incorporating a metal such as iron, cobalt, nickel, and lanthanum into a cathode carbon rod and carrying out an arc discharge (Patent Document 1).

However, in this production method, in addition to single-walled nanotubes, the product also includes multi-walled nanotubes, graphite, and amorphous carbon. Consequently, not only is the yield low, but there is unevenness in the diameter and the length of the single-walled nanotubes. Thus, in this method, it is difficult to produce single-walled nanotubes having a comparatively even diameter and length at a high yield.

In addition to the above-described arc method, further examples of methods for producing carbon nanotubes include gas-phase pyrolysis, laser sublimation, and condensed phase electrolysis (Patent Documents 2 to 4).

However, the production methods described in these documents are all either carried out in the laboratory or at a small-scale level, and suffer from the problem that especially the carbon material yield is low.

Accordingly, the present applicant has previously proposed production apparatuses and methods of carbon nano fibers being nano-scale carbon materials which can be continuously mass produced using a fluidized bed reaction method (Patent Documents 5 to 8).

PRIOR ART DOCUMENTS

Patent Documents

Patent Document 1: Japanese Patent Application Laid-Open No. Hei 06-280116
Patent Document 2: Japanese Patent No. 3100962
Patent Document 3: Japanese Translation of PCT Patent Application No. 2001-520615
Patent Document 4: Japanese Patent Application Laid-Open No. 2001-139317
Patent Document 5: Japanese Patent Application Laid-Open No. 2004-76197
Patent Document 6: Japanese Patent Application Laid-Open No. 2008-37694
Patent Document 7: Japanese Patent Application Laid-Open No. 2008-37695
Patent Document 8: Japanese Patent Application Laid-Open No. 2008-37696

Non-Patent Document

Non-Patent Document 1: S Iijima, Nature, 354, 56 (1991)

DISCLOSURE OF THE INVENTION

Problem to be Solved by the Invention

In the production of a nano-scale carbon material by the previously-proposed fluidized bed reaction methods, a fluidized catalyst acting as both a fluidized material and a catalyst forms a bubbling fluidized bed reactor by using coarsely-granulated secondary particles obtained by granulating primary particles, whereby a sufficient catalyst particle reaction time is achieved. However, since the carbon material is produced while becoming complexly entangled in the interior of the secondary particles, which are a granular material formed from primary particles, there is the problem that dispersibility deteriorates due to agglomeration of the carbon material as production progresses.

A cause for the formation of these nano-carbon material agglomerations is, as illustrated in FIG. 38, in the production of the nano-carbon material using a fluidized bed reactor, the use of a granulated catalyst 104A as a fluidized material, where the granulated catalyst 104A is produced by granulating a catalyst 103 formed from an active component 102 supported on a carrier 101 multiple times.

More specifically, as illustrated in FIG. 39, in the fluidized bed reactor, the granulated catalyst 104 turns into a catalyst-containing nano-carbon material 106 due to a nano-carbon material 105 growing from the active component 102 as a result of the feeding of the carbon raw material. However, since the nano-carbon material grows while becoming complexly entangled in pores in the carrier 101 and in gaps between particles of the catalyst 103, even after the catalyst 103 is removed by dissolving by an acid treatment, the nano-carbon material dries without the complex tangle unraveling, whereby it is believed the nano-carbon material agglomerations are formed.

Furthermore, as illustrated in FIG. 40, a nano-carbon dense layer 107 including a nano-carbon material is produced on the apparent surface of a granulated catalyst 104B formed from aggregates of the catalyst 103. This nano-carbon dense layer 107 cannot be utilized as a nano-carbon material, which leads to the effective nano-carbon material yield decreasing.

More specifically, as illustrated in FIGS. 39 and 40, the catalyst-containing nano-carbon material 106 in which the nano-carbon material has grown from the catalyst has the feature of primary particles. Several of these primary particles gather together to form the granulated catalyst 104B, which is a nano-carbon material growth product. During this process, because the carbon growth is very strong at the external surface due to maximum contact with the feed gas, the carbon becomes entangled, whereby this nano-carbon dense layer 107 is formed. It is strongly desired to increase the effective nano-carbon material yield and reduce the carbon bulk density by untangling this nano-carbon dense layer 107.

Furthermore, although recently the variety of carbon material applications is expanding, applications for nano-carbon materials free from agglomerations will spread. Therefore, there is a need for a production apparatus and method capable of producing a nano-carbon material having few agglomerations efficiently yet in large quantities.

In view of the above-described circumstances, it is an object of the present invention to provide a nano-carbon material production apparatus and method capable of producing a carbon material having few agglomerations efficiently yet in large quantities.

Means for Solving the Problem

Aspects of the invention to solve the problems discussed above and to achieve the purpose are summarized below.

1) According to an aspect of the present invention, a nano-carbon material production apparatus includes: a nano-carbon material production unit for producing a nano-carbon material using a granulated catalyst formed by granulating a carrier supporting an active component; an acid treatment unit for dissolving and separating a catalyst by an acid solution by feeding a catalyst-containing nano-carbon material into the acid solution; and an anti-agglomeration treatment unit, which is provided on either or both of an upstream side and a downstream side of the acid treatment unit, for performing an anti-agglomeration treatment to prevent agglomeration among nano-carbons due to repulsion among oxygen-containing functional groups added to the nano-carbon material.

2) Advantageously, in the nano-carbon material production apparatus, the anti-agglomeration treatment unit is a pH adjustment unit, which is provided on a downstream side of a washing unit, which is for washing the acid-treated nano-carbon material with water, for adjusting a pH of a washed aqueous solution to a weakly alkaline side. The oxygen-containing functional groups dissociated on the alkaline side electrostatically repel each other, so that a distance between the nano-carbons widens, preventing agglomeration.

3) Advantageously, in the nano-carbon material production apparatus, the anti-agglomeration treatment unit is an oxygen-containing functional group addition treatment unit, which is provided on an upstream side of the acid treatment unit, for adding an oxygen-containing functional group to the catalyst-containing nano-carbon material obtained by a nano-carbon production apparatus. Due to repulsion among the added oxygen-containing functional groups, a distance between the nano-carbons widens, preventing agglomeration.

4) Advantageously, in the nano-carbon material production apparatus, the anti-agglomeration treatment unit is an oxygen-containing functional group addition treatment unit, which is provided on a downstream side of the acid treatment unit, for adding an oxygen-containing functional group to the nano-carbon material from which the catalyst has been removed. Due to repulsion among the added oxygen-containing functional groups, a distance between the nano-carbons widens, preventing agglomeration.

5) Advantageously, in the nano-carbon material production apparatus, the anti-agglomeration treatment unit includes two types of units. A first anti-agglomeration treatment unit is an oxygen-containing functional group addition treatment unit, which is provided on an upstream side of the acid treatment unit, for adding an oxygen-containing functional group to the catalyst-containing nano-carbon material obtained by a nano-carbon production apparatus. Due to repulsion among the added oxygen-containing functional groups, a distance between the nano-carbons widens, preventing agglomeration. A second anti-agglomeration treatment unit is a pH adjustment unit, which is provided after a washing unit for washing the acid-treated nano-carbon material with water, for adjusting a pH of a washed aqueous solution to a weakly alkaline side. Oxygen-containing functional groups dissociated on the alkaline side electrostatically repel each other, so that a distance between the nano-carbons widens, preventing agglomeration.

6) Advantageously, the nano-carbon material production apparatus includes a quick-drying solvent displacement unit, which is provided on a downstream side of the washing unit, for displacing with a quick-drying solvent.

7) Advantageously, the nano-carbon material production apparatus includes a quick-drying solvent displacement unit, which is provided on a downstream side of the washing unit, for displacing with a quick-drying solvent.

8) Advantageously, the nano-carbon material production apparatus includes a quick-drying solvent displacement unit, which is provided on a downstream side of the washing unit, for displacing with a quick-drying solvent.

9) Advantageously, in the nano-carbon material production apparatus, a water-soluble dispersion and support agent for dispersing and supporting the nano-carbon material is fed to the acid treatment unit.

10) Advantageously, in the nano-carbon material production apparatus, a production apparatus for producing the catalyst-containing nano-carbon material is a fluidized bed reactor.

11) Advantageously, in the nano-carbon material production apparatus includes a fluidized catalyst feed apparatus for feeding a fluidized catalyst into the fluidized bed reactor.

12) Advantageously, in the nano-carbon material production apparatus, the fluidized catalyst has a particle size of 200 μm to 5 mm.

13) Advantageously, in the nano-carbon material production apparatus, the granulated catalyst formed by granulating the carrier supporting the active component is obtained from: a catalyst granulation unit for obtaining the granulated catalyst by granulating the carrier supporting the active component; and a granulated catalyst surface treatment unit for treating a surface of the granulated catalyst to decrease or reduce to zero a ratio of the active component on the surface present in at least an outermost layer of the granulated catalyst.

14) Advantageously, in the nano-carbon material production apparatus, an alkali adjustment chemical is any of ammonia and an amine.

15) According to another aspect of the present invention, a method for producing a nano-carbon material includes: producing a nano-carbon material using a granulated catalyst formed by granulating a carrier supporting an active component; and at an earlier stage, a later stage, or an earlier and a, later stage than an acid treatment, performing an anti-agglomeration treatment to prevent agglomeration among nano-carbons due to repulsion among oxygen-containing functional groups added to the nano-carbon material, the acid treatment performing an acid treatment by dispersing a catalyst-containing nano-carbon material in an acid solution.

16) Advantageously, in the method for producing a nano-carbon material, the anti-agglomeration treatment is a pH adjustment treatment, which is carried out at a later stage than a washing treatment for washing the acid-treated nano-carbon material with water, for adjusting a pH of a washed aqueous solution to a weakly alkaline side. Oxygen-containing functional groups dissociated on the alkaline side electrostatically repel each other, so that a distance between the nano-carbons widens, preventing agglomeration.

17) Advantageously, in the method for producing a nano-carbon material, the anti-agglomeration treatment is an oxygen-containing functional group addition treatment, which is carried out at an earlier stage than the acid treatment, for adding an oxygen-containing functional group to the catalyst-containing nano-carbon material obtained by a nano-carbon production apparatus. Due to repulsion among the added oxygen-containing functional groups, a distance between the nano-carbons widens, preventing agglomeration.

18) Advantageously, in the method for producing a nano-carbon material, the anti-agglomeration treatment is an oxygen-containing functional group addition treatment, which is carried out at a later stage than the acid treatment, for adding an oxygen-containing functional group to the nano-carbon material from which catalyst has been removed. Due to repulsion among the added oxygen-containing functional groups, a distance between the nano-carbons widens, preventing agglomeration.

19) Advantageously, in the method for producing a nano-carbon material, the anti-agglomeration treatment comprises two types of treatments. A first anti-agglomeration treatment is an oxygen-containing functional group addition treatment, which is carried out at an earlier stage than the acid treatment, for adding an oxygen-containing functional group to the catalyst-containing nano-carbon material obtained by a nano-carbon production apparatus. Due to repulsion among the added oxygen-containing functional groups, a distance between the nano-carbons widens, preventing agglomeration. A second anti-agglomeration treatment is a pH adjustment treatment, which is carried out at a later stage than a washing treatment for washing the acid-treated nano-carbon material with water, for adjusting a pH of a washed aqueous solution to a weakly alkaline side. Oxygen-containing functional groups dissociated on the alkaline side electrostatically repel each other, so that a distance between the nano-carbons widens, preventing agglomeration.

20) Advantageously, the method for producing a nano-carbon material, includes performing a quick-drying solvent displacement treatment, which is carried out at a later stage than the washing treatment, for displacing with a quick-drying solvent.

21) Advantageously, the method for producing a nano-carbon material, includes performing a quick-drying solvent displacement treatment, which is carried out at a last stage than the washing treatment, for displacing with a quick-drying solvent.

22) Advantageously, the method for producing a nano-carbon material, includes performing a quick-drying solvent displacement treatment, which is carried out at a last stage than the washing treatment, for displacing with a quick-drying solvent.

23) Advantageously, the method for producing a nano-carbon material, includes feeding a water-soluble dispersion and support agent for dispersing and supporting the nano-carbon material during the acid treatment.

24) Advantageously, the method for producing a nano-carbon material, includes the catalyst-containing nano-carbon material is produced by a fluidized bed reactor.

25) Advantageously, in the method for producing a nano-carbon material, the granulated catalyst formed by granulating the carrier supporting the active component is obtained by performing a granulated catalyst surface treatment for treating a surface of the granulated catalyst so that a ratio of the active component on the surface present in at least an outermost layer of the granulated catalyst is decreased or reduced to zero.

26) Advantageously, in the method for producing a nano-carbon material, an alkali adjustment chemical is any of ammonia and an amine.

Furthermore, to resolve the above-described problems, the present invention may also have the following configurations.

27) A nano-carbon material production apparatus includes: a nano-carbon material production unit for producing a nano-carbon material using a catalyst granular material formed by granulating a carrier supporting an active component; an acid treatment unit for dissolving and separating a catalyst by an acid solution by feeding a catalyst-containing nano-carbon material into the acid solution; a crushing treatment unit, which is provided either on an upstream side of the acid treatment unit or in the acid treatment unit, for crushing a nano-carbon dense layer formed by aggregation of nano-carbon formed on a surface of a secondary particle formed from aggregation of catalyst primary particles which are the grown nano-carbon material; a washing unit, which is provided on a downstream side of the acid treatment unit, for washing the acid-treated nano-carbon material with water; and a drying unit for drying the nano-carbon material washed with water.

28) A nano-carbon material production apparatus includes: a nano-carbon material production unit for producing a nano-carbon material using a catalyst granular material formed by granulating a carrier supporting an active component; an acid treatment unit for dissolving and separating a catalyst by an acid solution by feeding a catalyst-containing nano-carbon material into the acid solution; a washing unit for washing the acid-treated nano-carbon material with water; and a drying unit for drying the nano-carbon material washed with water, wherein a water-soluble dispersion and support agent for dispersing and supporting the nano-carbon material is fed to the acid treatment unit.

29) A nano-carbon material production apparatus includes: a nano-carbon material production unit for producing a nano-carbon material using a catalyst granular material formed by granulating a carrier supporting an active component; a resin fixing treatment unit for fixing with a resin a periphery of a catalyst granular material having a nano-carbon dense layer formed by aggregation of nano-carbon formed on a surface of a secondary particle formed from aggregation of catalyst primary particles which are the grown nano-carbon material; a resin crushing treatment unit for crushing the resin fixing the nano-carbon dense layer by crushing the catalyst-containing granular material fixed by the resin along with the resin; an acid treatment unit for dissolving and separating the catalyst by an acid solution by feeding the catalyst-containing nano-carbon material into the acid solution; a washing unit, which is provided on a downstream side of the acid treatment unit, for washing the acid-treated nano-carbon material with water; and a drying unit for drying the nano-carbon material washed with water.

30) A nano-carbon material production apparatus includes: a catalyst granulation unit for obtaining a granulated catalyst by granulating a carrier supporting an active component; a granulated catalyst surface treatment unit for treating a surface of the granulated catalyst to decrease or reduce to zero a ratio of the active component on the surface present in an outermost layer of the granulated catalyst; a nano-carbon material production unit for producing a nano-carbon material using the surface-treated granulated catalyst; an acid treatment unit for dissolving and separating the catalyst by an acid solution by feeding the catalyst-containing nano-carbon material into the acid solution; a washing unit, which is provided on a downstream side of the acid treatment unit, for washing the acid-treated nano-carbon material with water; and a drying unit for drying the nano-carbon material washed with water.

31) A nano-carbon material production apparatus includes: a nano-carbon material production unit for producing a nano-carbon material from a carbon raw material using a granulated catalyst formed by granulating a carrier supporting an active component; a combustion and removal substance addition unit for adding a substance for combustion and removal of nano-carbon around a catalyst granular material having a nano-carbon dense layer formed by aggregation of the nano-carbon formed on a surface of a secondary particle formed from aggregation of catalyst primary particles which are the grown nano-carbon material; a combustion treatment unit for combusting a nano-carbon dense layer of the surface-treated catalyst granular material; an acid treatment unit for dissolving and separating the catalyst by an acid solution by feeding the combusted catalyst-containing nano-carbon material into the acid solution; a washing unit, which is provided on a downstream side of the acid treatment unit, for washing the acid-treated nano-carbon material with water; and a drying unit for drying the nano-carbon material washed with water.

Effect of the Invention

According to the present invention, a nano-carbon material is produced using a granulated catalyst formed by granulating a carrier which supports an active component. Agglomeration among the nano-carbon material is prevented by performing an anti-agglomeration treatment for preventing agglomeration among the nano-carbon material due to repulsion among oxygen-containing functional groups added to the nano-carbon material before and/or after performing an acid treatment by dispersing a catalyst-containing nano-carbon material in an acid solution.

BRIEF DESCRIPTION OF THE DRAWINGS

FIG. 38 is a schematic diagram of a granulated catalyst.

FIG. 39 is a schematic diagram of a catalyst-containing nano-carbon material.

Figure 1:
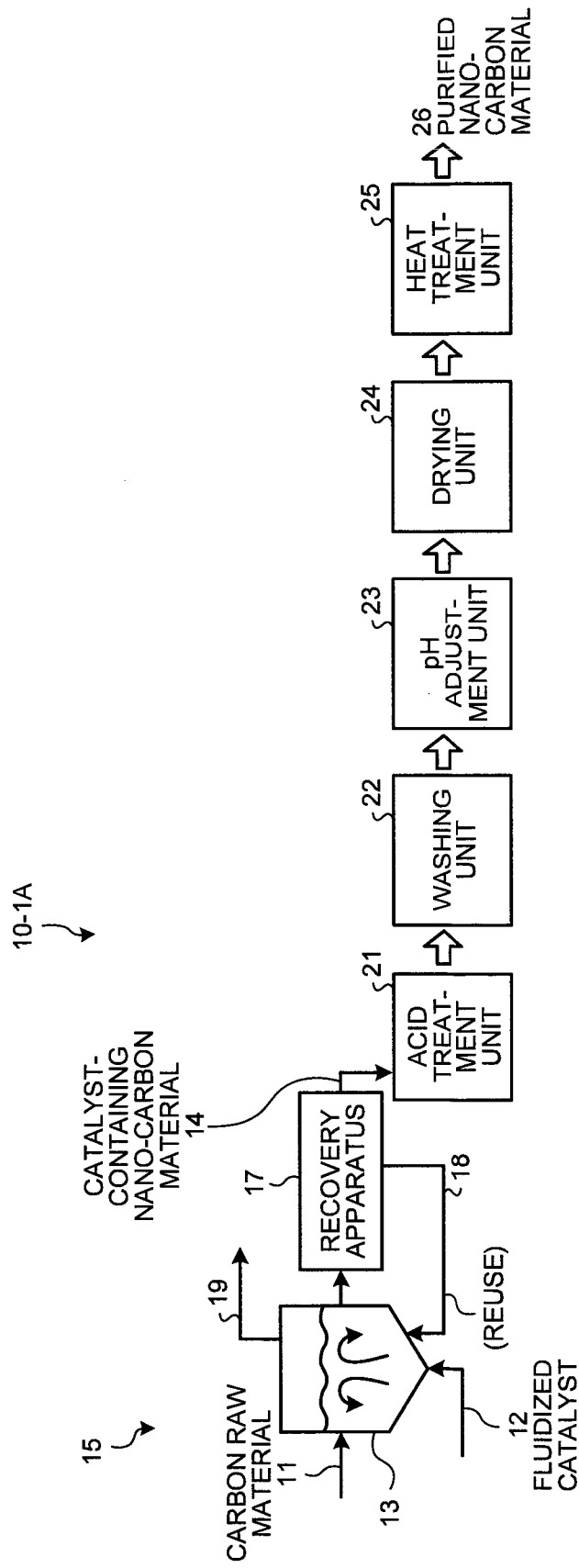
FIG. 1 is a schematic diagram of a nano-carbon material production apparatus according to a first embodiment for preventing tangling of carbon nanofibers by pH adjustment.

EXPLANATIONS OF NUMERALS 10-1A to 10-8C nano-carbon material production apparatus
14 catalyst-containing nano-carbon material
15 nano-carbon material production unit
21 acid treatment unit
22 washing unit
23 pH Adjustment unit
24 drying unit
25 heat treatment unit
26 purified nano-carbon material
27 oxygen-containing functional group addition unit
28 quick-drying solvent displacement unit

BEST MODES FOR CARRYING OUT THE INVENTION

Examples of the nano-carbon material production apparatus and method according to the present invention will now be described in more detail based on the drawings. However, the present invention is not limited to these examples.

The present invention will now be described in more detail with reference to the drawings. However, the present invention is not limited to these embodiments. Furthermore, the constituent elements in the following embodiments include elements which could be easily conceived of by the skilled person in the art, or elements substantially identical therewith.

The nano-carbon material production apparatus according to the present invention includes a nano-carbon material production unit, an acid treatment unit, and an anti-agglomeration treatment unit. The nano-carbon material production unit produces a nano-carbon material using a granulated catalyst formed by granulating a carrier supporting an active component. The acid treatment unit feeds a catalyst-containing nano-carbon material into an acid solution, and dissolves and separates the catalyst by the acid solution. The anti-agglomeration treatment unit is provided on either or both of an upstream side and a downstream side of the acid treatment unit, and performs an anti-agglomeration treatment to improve hydrophilicity due to oxygen-containing functional groups added to the nano-carbon material and to prevent agglomeration among nano-carbons due to repulsion among oxygen-containing functional groups. This repulsion among the oxygen-containing functional groups causes the gap between each of the entangled nano-carbons to widen, so that the tangles unravel. Additionally, the repulsion makes it more difficult for already unraveled nano-carbons to become entangled again.

Examples of the oxygen-containing functional group include, as described below, a hydroxyl group (—OH), a carboxyl group (—COOH) and the like. The gap between each of the entangled nano-carbons widens due to the repulsion among these functional groups when these functional groups have been added or when they are in a dissociated state due to pH adjustment, whereby the tangles unravel.

The subject matter of the present invention will now be described in more detail based on the following specific embodiments.

First Embodiment

FIG. 1 illustrates a schematic diagram of a nano-carbon material production apparatus according to the present embodiment for preventing tangling of carbon nanofibers by pH adjustment.

As illustrated in FIG. 1, a nano-carbon material production apparatus 10-1 according to this embodiment includes a nano-carbon material production unit 15, an acid treatment unit 21, a washing unit 22, a pH adjustment unit 23, a drying unit 24, and a heat treatment unit 25. The nano-carbon material production unit 15 produces a catalyst-containing nano-carbon material 14 by a fluidized bed reactor. The acid treatment unit 21 disperses the obtained catalyst-containing nano-carbon material 14 into an acid solution to dissolve and separate a fluidized catalyst 12, which is a granulated catalyst, by the acid solution. The washing unit 22 is provided on a downstream side of the acid treatment unit 21, and washes the acid-treated nano-carbon material with water. The pH adjustment unit 23 is provided on a downstream side of the washing unit 22, and adjusts the pH of the washed aqueous solution with a chemical to a weakly alkaline side. The drying unit 24 dries the nano-carbon material in a state in which the pH of the aqueous solution has been adjusted. The heat treatment unit 25 eliminates the chemical used for the alkaline adjustment by heat treatment to thereby produce a purified nano-carbon material 26.

In FIG. 1, reference numeral 17 denotes a recovery apparatus for separating the catalyst-containing nano-carbon material 14 and the fluidized catalyst 12, reference numeral 18 denotes a reuse line for reusing the separated fluidized catalyst 12 with a fluidized bed reactor 13, and reference numeral 19 denotes exhaust gas.

Figure 2:
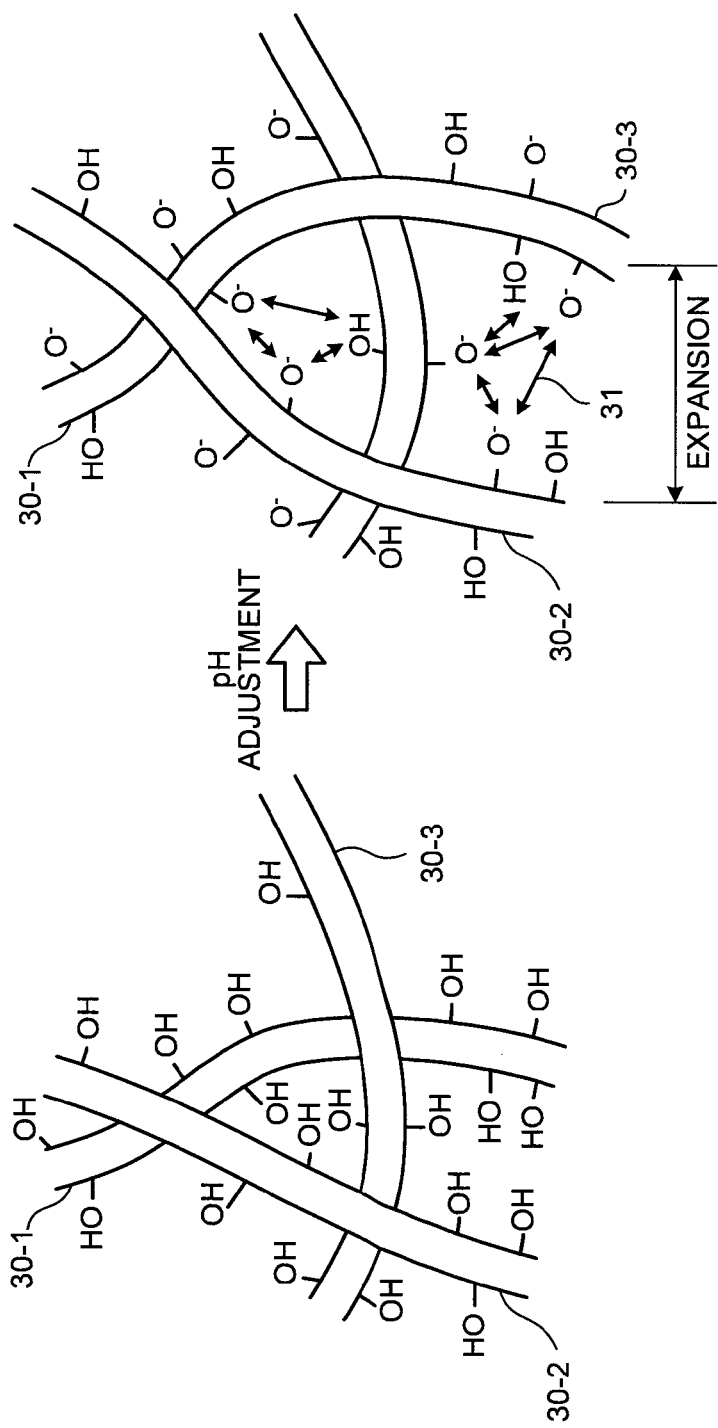
FIG. 2 is a schematic diagram illustrating nano-carbon behavior from pH adjustment.

FIG. 2 is a schematic diagram illustrating the behavior of each nano-carbon due to pH adjustment.

As illustrated in FIG. 2, first, an oxygen-containing functional group, such as a hydroxyl group (—OH) or a carboxyl group (—COOH), is added to nano-carbons (in the present embodiment, three strands) 30-1 to 30-3 in an aqueous solution (pH 5 to 6) which was subjected to a washing treatment with the washing unit 22 after performing an acid treatment with the acid treatment unit 21.

Then, from this state of pH 5 to 6, the pH is adjusted to the alkaline side of a pH of 7 or more (more preferably, to about pH 8 to 10) to dissociate the oxygen-containing functional group, such as a hydroxyl group (—OH) or a carboxyl group (—COOH), on the nano-carbons (in the present embodiment, three strands) 30-1 to 30-3. These dissociated oxygen-containing functional groups electrostatically repel 31 each other, which causes the distance between the nano-carbons to widen, thereby preventing agglomeration.

Furthermore, in FIG. 2, although only —OH groups are schematically illustrated as the oxygen-containing functional group, the present invention is not limited to this.

The nano-carbon material in which agglomeration was prevented is, as illustrated in FIG. 1, dried by the drying unit 24, then sent to the heat treatment unit 25. At the heat treatment unit 25, the dried nano-carbon material is heat treated under a nitrogen atmosphere from 300 to 1,100° C. for about 30 minutes to 2 hours, and preferably from 300 to 900° C. for about 1 hour. As a result of this heat treatment, the alkali adjustment chemical is eliminated, so that a purified nano-carbon material 26 free from agglomerations is obtained.

Examples of the chemical used for pH adjustment in the present invention include amines such as ammonia and diethylamine, and alkali salts including a Group I element such as Na or K. However, any material that adjusts the pH to be weakly alkaline and is readily eliminated by a heat treatment may also be used.

Furthermore, when removing the catalyst by the acid treatment unit 21, dispersion may be carried out using a stirring apparatus or an ultrasonic homogenizer, for example. Here, as the acid used by the acid treatment unit 21, it is preferred to use a strong acid such as sulfuric acid, hydrochloric acid, nitric acid, aqua regia, and hydrofluoric acid. In addition to a strong acid, an auxiliary agent such as hydrogen peroxide may also be added. Moreover, a surfactant may also be used to promote the dispersion effect.

Examples of the drying unit 24 in the present invention include, but are not especially limited to, in addition to drying by a common dryer, spray drying means, freeze drying means, and low-temperature spray freeze drying means.

Here, the nano-carbon material 31 is formed by growing from the active component 102 of the granulated catalyst 104A as illustrated in the above-described FIG. 38. The granulated catalyst 104A may be formed from aggregates or agglomerations of catalyst primary particles of the carrier supporting the active component. Furthermore, the particle size of the granulated catalyst, which is a secondary particle formed from such catalyst primary particles, is 200 μm to 5 mm, preferably 500 μm to 2,000 μm, and more preferably 500 μm to 1,000 μm.

Here, to obtain the granulated catalyst in which catalyst primary particles are aggregated or agglomerated, first, a product formed by granulating catalyst primary particles with a binder or a molded product formed by pressing catalyst primary particles with a pressing apparatus are obtained. Then, size classification is carried out to obtain a product having a predetermined particle size.

Furthermore, as the specific surface area of the catalyst formed from the secondary particles, from the perspective of improving the yield of the carbon material, 100 m$^2$ or more is preferred as the yield improves.

Furthermore, since countless pores are present in the carrier, the growth space of the carbon material is limited by the size of those pores, and especially by the ratio of (small pore diameter/large pore diameter) in the carrier. This growth space effects the tangle dispersibility of the carbon material. For a representative diameter in which the small pore diameter is 5 nm and the large pore diameter is 100 nm, the pore capacity ratio of that pore system may be 20 or less, and preferably 10 or less. This is because if this ratio exceeds 20, the carbon material which grows on that carrier is strongly tangled, so that the tangle dispersibility deteriorates.

Consequently, if this ratio exceeds 20, the active component disperses into the carrier pores having a narrow diameter (φ), and the nano-carbon material grows from this active component. As a result, the nano-carbon material becomes entangled during its growth. Such a tangled nano-carbon material will not have, for example, good dispersibility in a solution, a resin and the like.

On the other hand, if the above ratio is 20 or less, and preferably 10 or less, the active component disperses at flat locations of the carrier, and the nano-carbon material grows from this active component. As a result, the ratio of nano-carbon material which entirely grows straight increases. Consequently, the dispersibility in a solution, a resin and the like of such a nano-carbon material is favorable.

As an example, if the representative diameter for the small pore diameter is 5 nm and the representative diameter for the large pore diameter is 50 nm, the above ratio may be 5 or less, preferably 3 or less, and more preferably 1 or less.

As another example, if the representative diameter for the small pore diameter is 5 nm and the representative diameter for the large pore diameter is 100 nm, the above ratio may be 10 or less, preferably 8 or less, and more preferably 3 or less.

In this case, compared with the pores of 5 nm diameter, the pores are relatively larger at 50 nm and 100 nm, which is preferred because the dispersibility increases.

Here, the above small pore diameter is 30 nm or less, and preferably in the range of 0.1 to 30 nm. The above large pore diameter is 30 nm or more, and preferably in the range of 30 to 200 nm. If the small and large pore diameters are thus set, the ratio thereof may be 20 or less, and preferably 10 or less.

Furthermore, if the pore size distribution is small, the determination regarding large and small does not have to be based on 30 nm as a demarcation. For example, the determination may be 20 nm, 15 nm, or 10 nm as a demarcation for determining large and small.

It is preferred that the nano-carbon material according to the present invention is not a stand-alone material, and that a ratio of bundled carbon material present in a multiply-bundled state is 1 to 95%, and more preferably 1 to 80%. Further, in the present invention "bundled carbon" refers to a collection of two or more strands of the carbon material, and includes cases in which a few strands are collected to cases in which many strands are collected.

The structure of the nano-carbon material according to the present invention is preferably any of fibrous, granular, and tubular.

Here, "granular" refers to a structure formed by crystallites composed of graphite layers composed of a material formed from a single carbon hexagonal plane aggregating.

The "fibrous structure" is any of: a structure in which carbon hexagonal planes are laminated and the lamination method thereof is along a fiber axis; a structure in which an oblique direction (1 to 89° of a so-called platelet laminate is the fiber axis; a so-called herringbone or fishbone structure; a structure having a fiber axis perpendicular to the lamination direction; and a so-called tubular, ribbon, or parallel structure. Furthermore, the slants of the herringbone structure are formed as a pair. The slants in this pair do not have to have the same incline.

The carbon material according to the present invention preferably has a tubular shape, and the tube walls are preferably a single-walled structure or a double-wall structure.

Here, for a single-walled structure, the concentration thereof is preferably 20 to 99%, and more preferably 85 to 99%. Furthermore, the concentration of single walls and double walls combined is preferably 20 to 99%, and more preferably 75 to 99%.

In addition, for a multi-walled structure of three walls or more, the tubular shape preferably has a ratio of carbon hexagonal planes of 1.3 to 30%, and more preferably 1.3 to 15%.

The nano-carbon material has a diameter of preferably 0.4 nm or more, more preferably 0.4 to 3.5 nm, and still more preferably 1.5 to 3.5 nm. Furthermore, it is preferred that the ratio having a diameter of 1.5 to 3.5 nm is 85%.

Examples of the above-described active component in the present invention include, but are not limited to, any one kind of V, Cr, Mn, Fe, Co, Ni, Cu, Zn, W, Mo, or a combination thereof.

Examples of the above-described carrier in the present invention include, but are not limited to, aluminum compounds such as alumina, silica, sodium aluminate, alum, and aluminum phosphate, calcium compounds such as calcium oxide, calcium carbonate, and calcium sulfate, magnesium compounds such as magnesium oxide, magnesium hydroxide, and magnesium sulfate, and apatites such as calcium phosphate and magnesium phosphate. The carrier may include two or more kinds of these compounds.

Here, "apatite" is a mineral having a $M_{10}^{2+}(Z^{5-}O_4)_6X_2^-$ structure, in which one or two kinds or more of the following various elements are present in solid state as M, $ZO_4$, and X.
M: Ca, Pb, Ba, Sr, Cd, Zn, Ni, Mg, Na, K, Fe, Al etc.
$ZO_4$: $PO_4$, $AsO_4$, $VO_4$, $SO_4$, $SiO_4$, $CO_4$
X: F, OH, Cl, Br, O, I Furthermore, as the carrier, a mesoporous material such as talc ($MgAl_2O_3$), other minerals, zeolite, and mesoporous silicate may also be used.

In addition, a diffusion layer including both the active component and the carrier may be formed on the surface of the carrier due to the interaction between them, and the diffusion layer may cover a portion of the active component catalyst to miniaturize the exposed portions of the active component catalyst.

In this case, since the nano-carbon material only grows from the miniaturized active component portion, only a single-walled nano-carbon material can be produced well.

Figure 3:
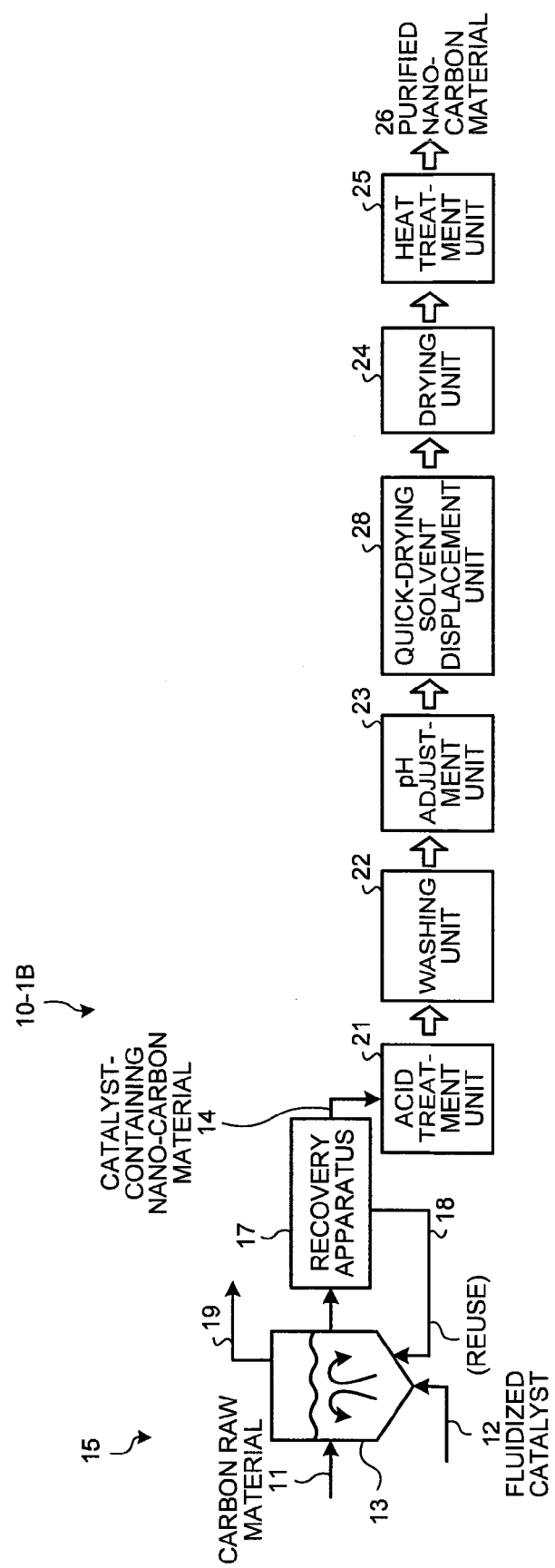
FIG. 3 is a schematic diagram of another nano-carbon material production apparatus according to the first embodiment for preventing tangling of carbon nanofibers by pH adjustment.

FIG. 3 illustrates a schematic diagram of another nano-carbon material production apparatus according to the first embodiment for preventing tangling of carbon nanofibers by pH adjustment.

As illustrated in FIG. 3, a nano-carbon material production apparatus 10-1B according to the present embodiment is further provided with a quick-drying solvent displacement unit 28 on the downstream side of the pH adjustment unit 23 in the nano-carbon material production apparatus 10-1A.

Figure 4:
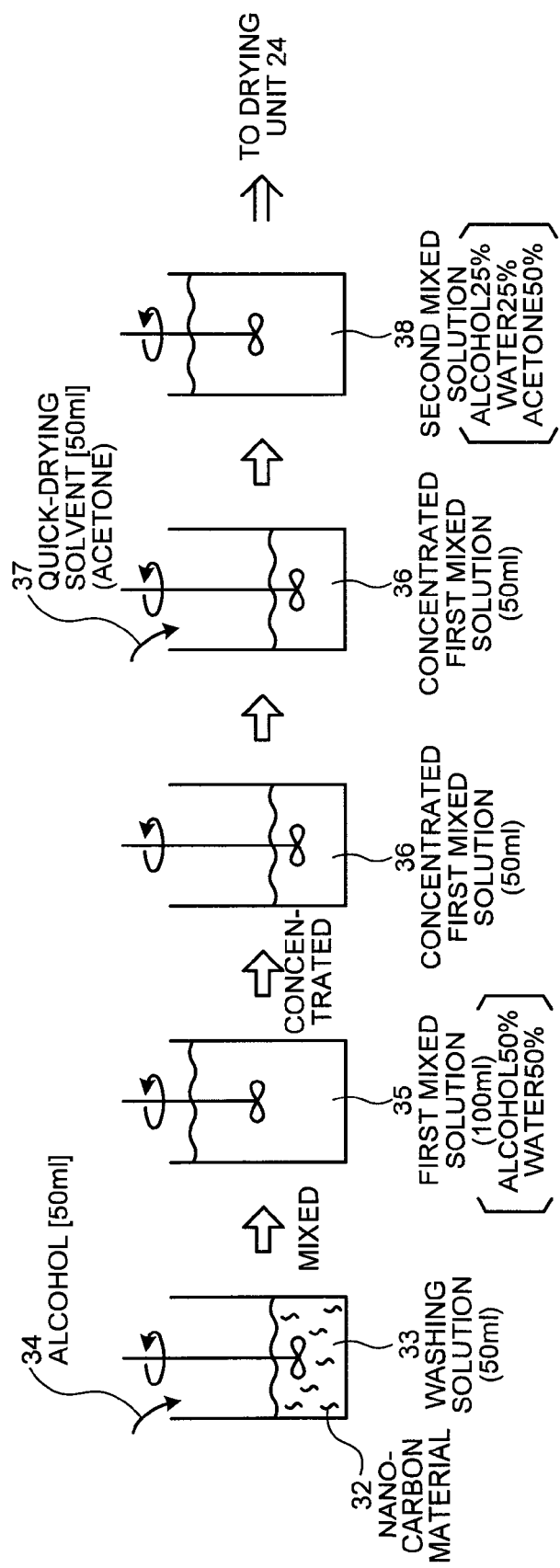
FIG. 4 is a schematic diagram of the step of quick-drying solvent displacement in a quick-drying solvent displacement unit.

FIG. 4 illustrates a schematic diagram of the step of quick-drying solvent displacement in the quick-drying solvent displacement unit. As illustrated in FIG. 4, in the quick-drying solvent displacement unit 28, a nano-carbon material 32 from which the catalyst has been removed is floating in a washing solution 33 in a water tank which was subjected to a washing treatment with water by a washing unit 22.

First, as illustrated in FIG. 4, to this washing solution (50 mL) 33, the same amount (50 mL) of an alcohol (for example, ethanol) is added to obtain a first mixed solution 35. This first mixed solution 34 consists of 50% alcohol and 50% water. Subsequently, this first mixed solution 35 is filtered and concentrated by a means such as centrifugal separation to obtain a total amount of 50 mL of a concentrated first mixed solution 36.

Then, 50 mL of acetone, which is a quick-drying solvent 37, is added to the concentrated first mixed solution 36 to obtain a second mixed solution 38. This second mixed solution 38 consists of 25% alcohol, 25% water, and 50% acetone.

Since about 50% of this second mixed solution 38 is replaced by acetone, which is the quick-drying solvent 37, the drying rate at the subsequent drying unit 24 improves, so that agglomeration among the nano-carbon material is prevented.

Here, as the solvent used by the quick-drying solvent displacement unit 28, lower alcohols such as ethanol, methanol, and isopropyl alcohol, acetone, or hexane are especially preferred.

Furthermore, it is preferred that the displacement ratio from the water is at least 50%. This is because if the displacement ratio is less than 50%, the effect of suppressing condensing of the nano-carbon material during the drying by the drying unit 24 is not exhibited.

Thus, by providing the quick-drying solvent displacement unit 28, about 50% of the second mixed solution 38 is replaced by acetone, which is a quick-drying solvent 37, so that the drying rate at the subsequent drying unit 24 improves, and agglomeration among the nano-carbon material is further prevented.

Figure 5:
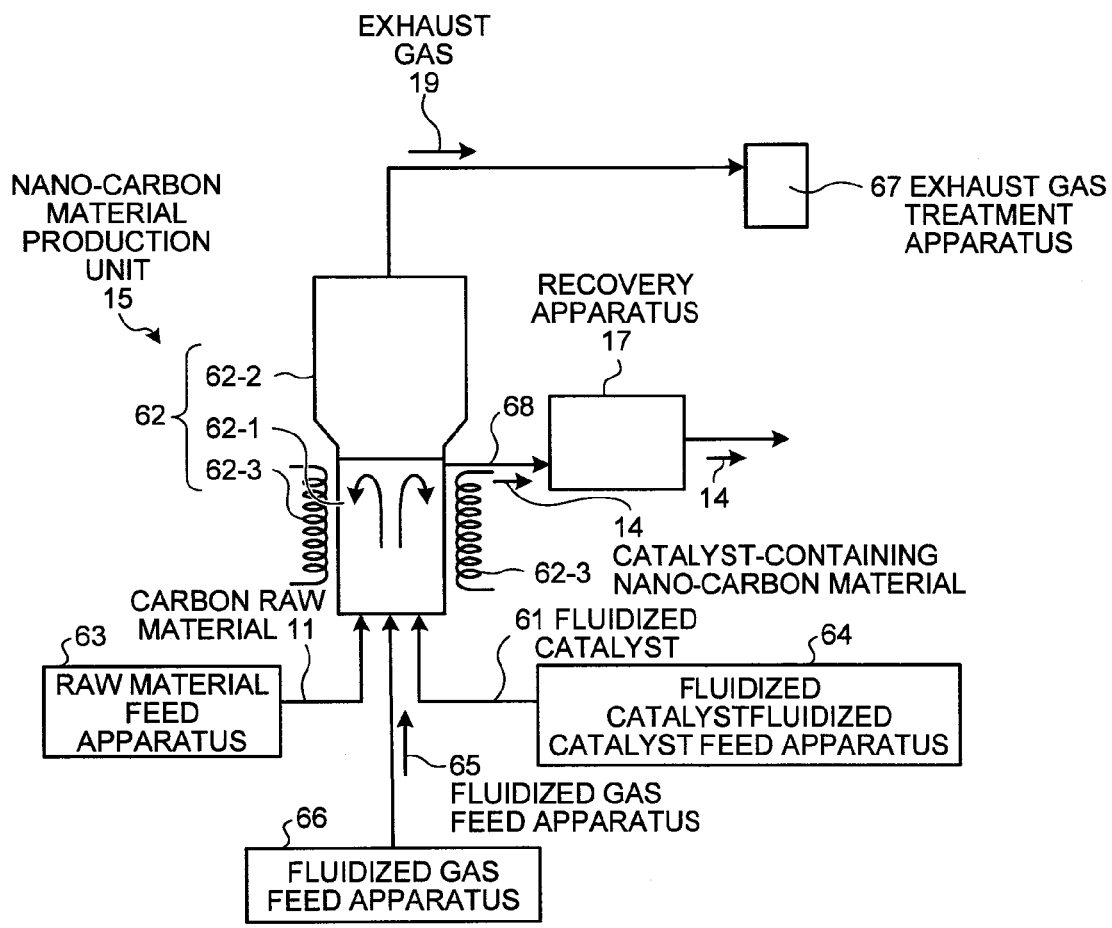
FIG. 5 is a schematic diagram of a nano-carbon material production unit.

Next, an example of when a fluidized bed reactor is used as the reactor for producing the nano-carbon material will be described with reference to FIG. 5. FIG. 5 is a schematic diagram of a nano-carbon material production unit. In the present embodiment, a catalyst for nano-carbon material production formed from secondary particles having a predetermined particle size obtained by consolidation of catalyst primary particles formed from a carrier (magnesium oxide) supporting an active component (iron) is used as a fluidized catalyst 61 that combines both a catalytic activity and a flow behavior.

As illustrated in FIG. 5, a nano-carbon material production unit 15 according to the present embodiment includes a fluidized bed reaction unit 62-1, a raw material feed apparatus 63, a fluidized catalyst feed apparatus 64, a freeboard unit 62-2, a fluidized gas feed apparatus 66, a heating unit 62-3, an exhaust gas treatment apparatus 67, and a recovery apparatus 17. The fluidized bed reaction unit 62-1 is filled in its interior with a fluidized catalyst 61, which acts both as a catalyst and as a fluidized material. The raw material feed apparatus 63 feeds a carbon raw material 11, which is a carbon source, into the fluidized bed reaction unit 62-1. The fluidized catalyst feed apparatus 64 feeds the fluidized catalyst 61 into the fluidized bed reaction unit 62-1. The freeboard unit 62-2 has a space into which the fluidized catalyst 61, being the fluidized material in the fluidized bed reaction unit 62-1, scatters and flows. The fluidized gas feed apparatus 66 introduces a fluidized gas 65 into the fluidized bed reaction unit 62-1 and causes the fluidized catalyst 61 therein to flow. The heating unit 62-3 heats the fluidized bed reaction unit 62-1. The exhaust gas treatment apparatus 67 treats an exhaust gas 19 exhausted from the freeboard unit 62-2. The recovery apparatus 17 extracts the catalyst-containing nano-carbon material 14 from the fluidized bed reaction unit 62-1 in a recovery line 68 for recovery.

Examples of fluidized bed reaction modes in the fluidized bed reaction unit 62-1 include a bubbling fluidized bed type and a jet fluidized bed type. In the present invention, either of these may be used.

In the present embodiment, a fluidized bed reactor 62 is configured from the fluidized bed reaction unit 62-1, the freeboard unit 62-2, and the heating unit 62-3. Furthermore, it is preferred that the freeboard unit 62-2 has a larger flow path cross-sectional area than the fluidized bed reaction unit 62-1.

The carbon material 11, which is the raw material gas fed from the raw material feed apparatus 63, may be any compound containing carbon. Examples thereof in the present invention include, but are not limited to, in addition to CO and $CO_2$, alkanes such as methane, ethane, hexane, and propane, unsaturated organic compounds such as ethylene, propylene, and acetylene, aromatic compounds such as benzene and toluene, organic compounds having an oxygen-containing functional group such as alcohols, ethers, and carboxylic acids, polymer materials such as polyethylene and polypropylene, or oil and coal (including coal converted gas). Furthermore, to control the oxygen concentration, two or more of an oxygen-containing carbon source such as CO, $CO_2$, an alcohol, an ether, and a carboxylic acid, and a non-oxygen-containing carbon source may be combined and fed.

This carbon material 11 is fed in a gaseous state into the fluidized bed reaction unit 62-1, where a uniform reaction occurs due to the fluidized catalyst 61, which is a fluidized material, under stirring to cause a nano-carbon material to grow. During this process, to achieve predetermined fluidized conditions, an inert gas is introduced as a separate fluidized gas 65 into the fluidized bed reaction unit 62-1 by the fluidized gas feed apparatus 66.

Furthermore, the temperature in the fluidized bed reaction unit 62-1 is set by the heating unit 62-3 to a range of 300 to 1,300° C., and more preferably 400 to 1,200° C. The carbon material 11, such as methane, is brought into contact with the catalyst for a fixed period of time in an environment in which an impurity carbon degradation product is also present to produce the nano-carbon material.

Examples of apparatuses which can be used as the above-described recovery apparatus 17 include, in addition to a cyclone, known separation means such a bag filter, a ceramic filter, and a sieve.

Furthermore, the catalyst-containing nano-carbon material 14 separated by the recovery apparatus 17 is, as described above, recovered as a nano-scale purified nano-carbon material (for example, a carbon nanotube, a carbon nanofiber etc.) 26 free from agglomerations, by removing the catalyst adhered to the nano-carbon material with the acid treatment unit 21, washing unit 22, pH adjustment unit 23, and drying unit 24.

Furthermore, by providing the quick-drying solvent displacement unit 28 on the downstream side of the pH adjustment unit 23, a nano-scale purified nano-carbon material (for example, a carbon nanotube, a carbon nanofiber etc.) 26 having even less agglomerations can be recovered.

Second Embodiment

Figure 6:
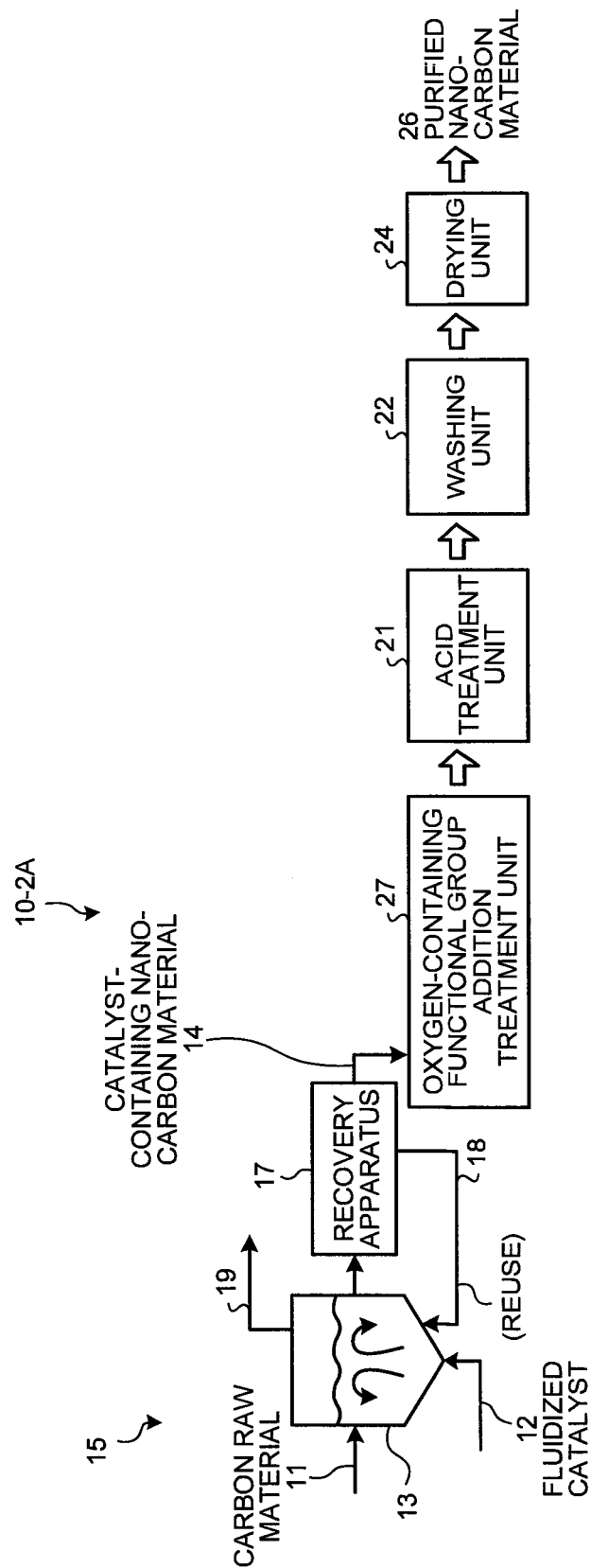
FIG. 6 is a schematic diagram of a nano-carbon material production apparatus according to a second embodiment for performing an oxygen-containing functional group addition treatment.
Figure 7:
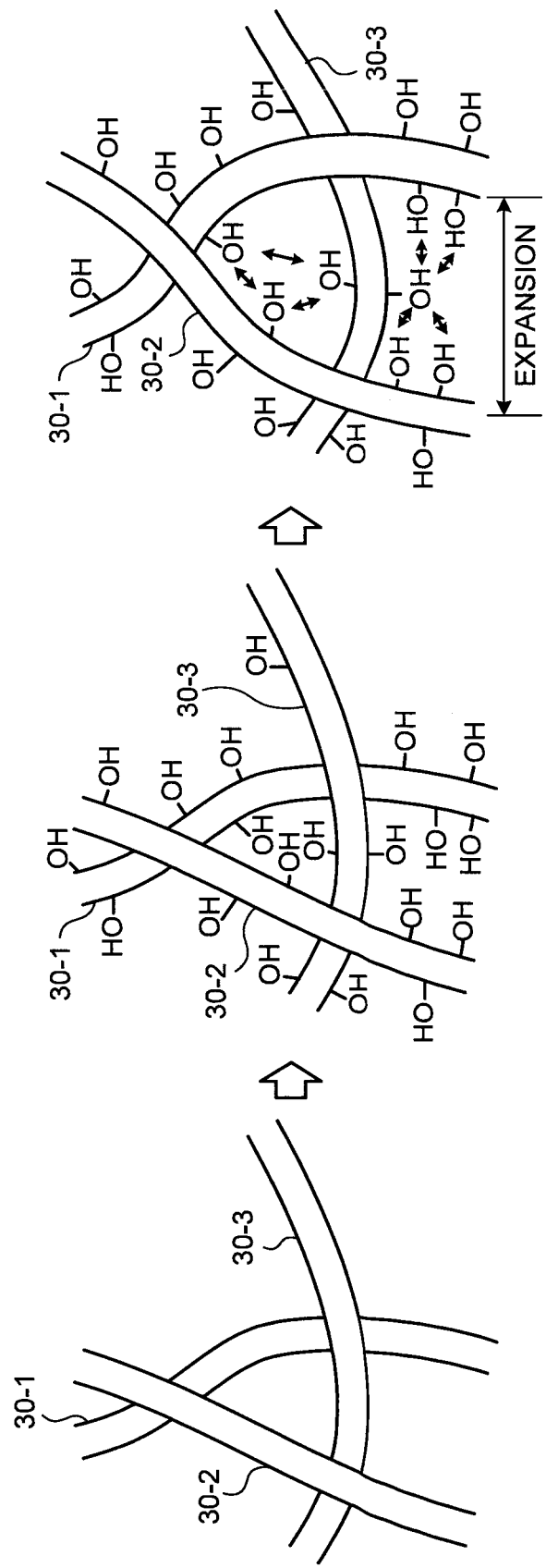
FIG. 7 is a schematic diagram illustrating nano-carbon behavior due to repulsion among oxygen-containing functional groups.

FIG. 6 illustrates a schematic diagram of a nano-carbon material production apparatus according to a second embodiment for performing an addition treatment of an oxygen-containing functional group. FIG. 7 is a schematic diagram illustrating nano-carbon behavior due to repulsion among oxygen-containing functional groups. In the second embodiment, parts which are the same as in the apparatus according to the first embodiment illustrated in FIG. 1 are denoted with the same reference numerals, and a description thereof will be omitted (hereinafter the same).

As illustrated in FIG. 6, a nano-carbon material production apparatus 10-2A according to the second embodiment includes a nano-carbon material production unit 15, an oxygen-containing functional group addition treatment unit 27, an acid treatment unit 21, a washing unit 22, and a drying unit 24. The nano-carbon material production unit 15 produces a catalyst-containing nano-carbon material 14 by a fluidized bed reactor 13. The oxygen-containing functional group addition treatment unit 27 adds an oxygen-containing functional group to the obtained catalyst-containing nano-carbon material 14. The acid treatment unit 21 dissolves and separates a fluidized catalyst 12, which is a granulated catalyst, by an acid solution by dispersing in the acid solution the catalyst-containing nano-carbon material 14 to which an oxygen-containing functional group was added. The washing unit 22 washes the acid-treated nano-carbon material with water. The drying unit 24 dries the washed nano-carbon material to produce a purified nano-carbon material 26.

Here, the oxygen-containing functional group addition treatment unit 27 is not especially limited, as long as it is means for adding, or causing to be added, an oxygen-containing functional group onto the surface of the nano-carbon material. Either or both of a physical treatment and a chemical treatment may be used to carry this out.

Examples of physical treatments include, under an oxygen atmosphere, a heat treatment, a steam oxidation treatment, a plasma treatment, a sputtering treatment, or a discharge treatment such as glow discharge, arc discharge, corona discharge, and streamer discharge. The oxygen-containing functional group is added, or caused to be added, onto the surface of the nano-carbon material by carrying out any one or a combination of these.

Furthermore, examples of chemical treatments include a polymer grafting treatment carried out using a polymer and the like, a surface modification reaction treatment carried out by an oxidation treatment, and a surfactant treatment. The oxygen-containing functional group is added, or caused to be added, onto the surface of the nano-carbon material by carrying out any one or a combination of these.

Examples of the oxidation treatment include oxidation treatments carried out using a strong acid, such as sulfuric acid and hydrochloric acid. In this case, the addition of the oxygen-containing functional group and the dissolving and separation by the acid solution of the fluidized catalyst 12, which is a granulated catalyst, may also be carried out in a single process.

More specifically, although an acid treatment tank for the addition of the oxygen-containing functional group may be separately and independently provided, the oxygen-containing functional group addition treatment and the catalyst removal treatment may also be carried out simultaneously in the acid treatment tank for catalyst removal.

As the surfactant for adding the oxygen-containing functional group, any of an anionic surfactant, a cationic surfactant, an amphoteric surfactant, and a nonionic surfactant may be used. Examples include inorganic acid esters, cyclic ethers, carboxylic acid anhydrides, dicarboxylic acids, aliphatic carboxylic acids, unsaturated carboxylic acids, alicyclic ketones, alicyclic alcohols, aliphatic alcohols, aliphatic chlorinated compounds, aliphatic amines, aliphatic nitriles, unsaturated fatty acids, carboamides, aromatic polyamides, azo compounds, pyrene functionalized block copolymers, cellulose derivatives, long chain benzenediazonium, glucose oxidase, alicyclic nitrile compounds, quinoid compounds, polyols, diols, diamines, dienes and the like.

Now, referring to FIG. 7, how the oxygen-containing functional group is added to the nano-carbon material constituting the dense layer and how the nano-carbons unravel will be described. In the present embodiment, although the nano-carbon material still has the catalyst adhered to it (this catalyst is formed from the active component and the carrier), the catalyst will not be illustrated in the drawings.

As illustrated in FIG. 7, first, nano-carbons 31-1 to 31-3 (in the present embodiment, there are three strands) constituting the dense layer are entangled in a complex manner (refer to the diagram on the left side of FIG. 7). Next, the nano-carbons 31-1 to 31-3 constituting the carbon dense layer are treated by the oxygen-containing functional group addition treatment unit 27, whereby an oxygen-containing functional group (for example, —OH) is added to the surface of the nano-carbons 31-1 to 31-3 (refer to the center diagram of FIG. 7). At this stage, the nano-carbons are still entangled.

Subsequently, gaps in the nano-carbon material widen due to the added oxygen-containing functional groups (for example, —OH) repelling each other, whereby the nano-carbon material unravels (refer to the diagram on the right side of FIG. 7).

Consequently, although conventionally the dense carbon layer does not contribute as effective nano-carbon, the unraveling of the tangles among the nano-carbon material contributes to an improved yield of good-quality nano-carbon material free from tangles.

Furthermore, examples of the oxygen-containing functional group include, in addition to a hydroxyl group (—OH), a carboxyl group (—COOH), an oxo group (=O), an ether group (—O—) and the like.

Thus, by adding an oxygen-containing functional group such as, in addition to a hydroxyl group (—OH), a carboxyl group (—COOH), an oxo group (=O), and an ether group (—O—), the oxygen ratio is increased. Therefore, due to the addition of an oxygen-containing functional group carried out in the present invention, the number of oxygens increases. Consequently, the nano-carbon material according to the present invention has an O (number of oxygens in an atomic state)/C (number of carbons in an atomic state) ratio of 0.01 to 0.2, preferably 0.02 to 0.1, and more preferably 0.02 to 0.08.

Here, regarding the oxygen/carbon ratio, the reason why the O (number of oxygens in an atomic state)/C (number of carbons in an atomic state) ratio is set at 0.01 to 0.2 is that if the number of oxygens in an atomic state is increased by excessively carrying out the oxygen-containing functional group treatment, defects are produced on the surface of the nano-carbon material, and the nano-carbon material is cut, which are not desirable.

Furthermore, by adding an oxygen-containing functional group by the oxygen-containing functional group addition treatment unit 27, the nano-carbon material becomes hydrophilic, so that the composite effect of preventing subsequent agglomeration when the nano-carbon material comes into contact with moisture in the acid treatment unit 21 can be exhibited.

Figure 8:
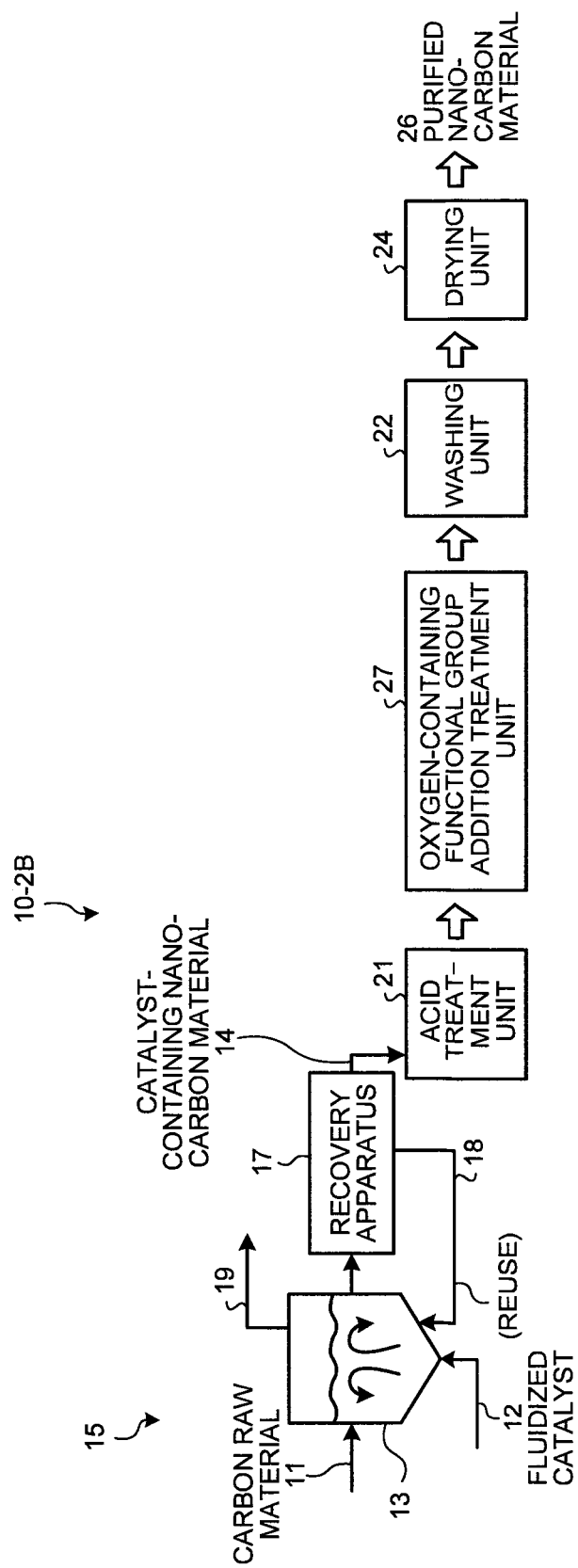
FIG. 8 is a schematic diagram of another nano-carbon material production apparatus according to the second embodiment for performing an oxygen-containing functional group addition treatment.

In addition, other than the oxygen-containing functional group addition treatment unit 27 performing treatment before the acid treatment unit 21 like the nano-carbon material production apparatus 10-2A illustrated in FIG. 6, the oxygen-containing functional group addition treatment unit 27 may be provided on the downstream side of the acid treatment unit 21, like the nano-carbon material production apparatus 10-2B illustrated in FIG. 8, to carry out the oxygen-containing functional group addition treatment.

Figure 9:
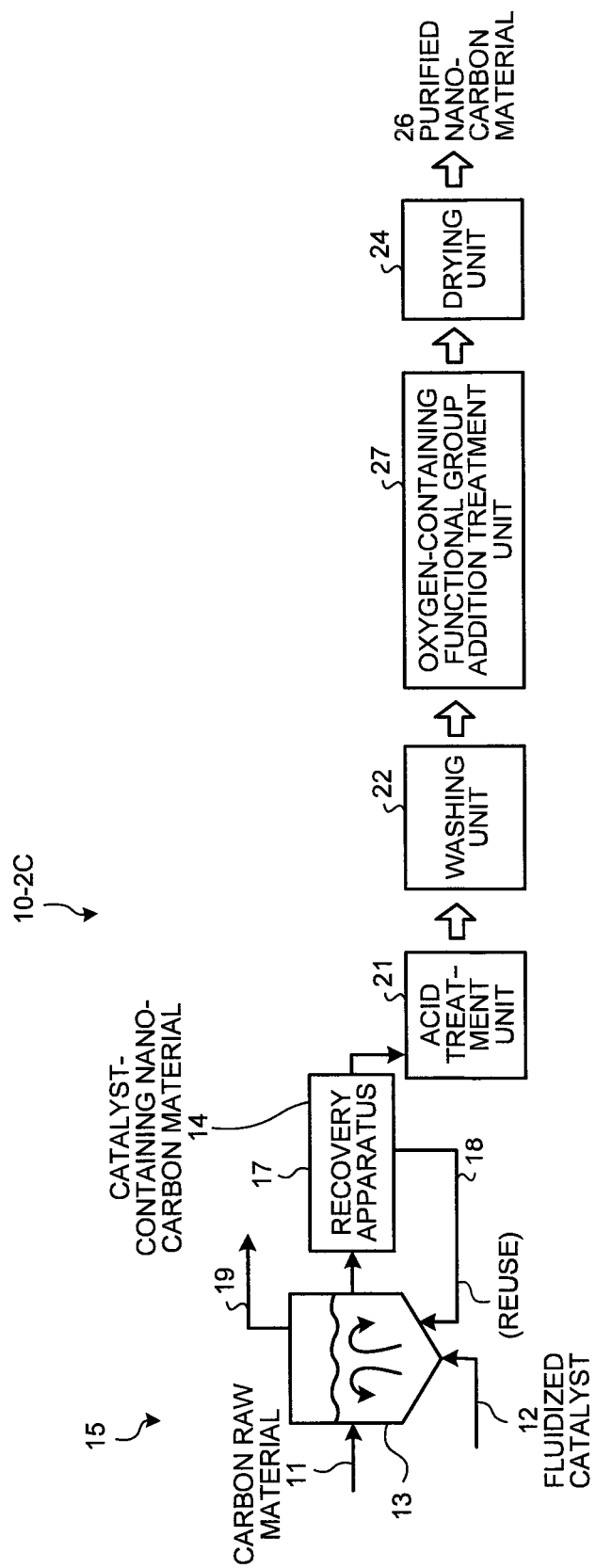
FIG. 9 is a schematic diagram of another nano-carbon material production apparatus according to the second embodiment for performing an oxygen-containing functional group addition treatment.

Moreover, the oxygen-containing functional group addition treatment unit 27 may be provided on the downstream side of the washing unit 22, like the nano-carbon material production apparatus 10-2C illustrated in FIG. 9, to carry out the oxygen-containing functional group addition treatment.

As illustrated in FIGS. 8 and 9, if the oxygen-containing functional group addition treatment unit 27 is provided on the downstream side of the acid treatment unit 21, the catalyst is removed with an acid by the acid treatment unit 21. Therefore, rather than the oxygen-containing functional group being added to the catalyst-containing nano-carbon material, the oxygen-containing functional group is added to a nano-carbon material from which the catalyst has been removed. However, if some of the catalyst has not been removed, this corresponds to the oxygen-containing functional group being added to the catalyst-containing nano-carbon material.

Furthermore, by adding an oxygen-containing functional group by the oxygen-containing functional group addition treatment unit 27, the nano-carbon material becomes hydrophilic, so that subsequent agglomeration when the nano-carbon material comes into contact with moisture in the washing unit 22 is prevented. Therefore, as illustrated in FIG. 8, it is preferred to carry out the oxygen-containing functional group addition treatment at a stage prior to the washing treatment.

Figure 10:
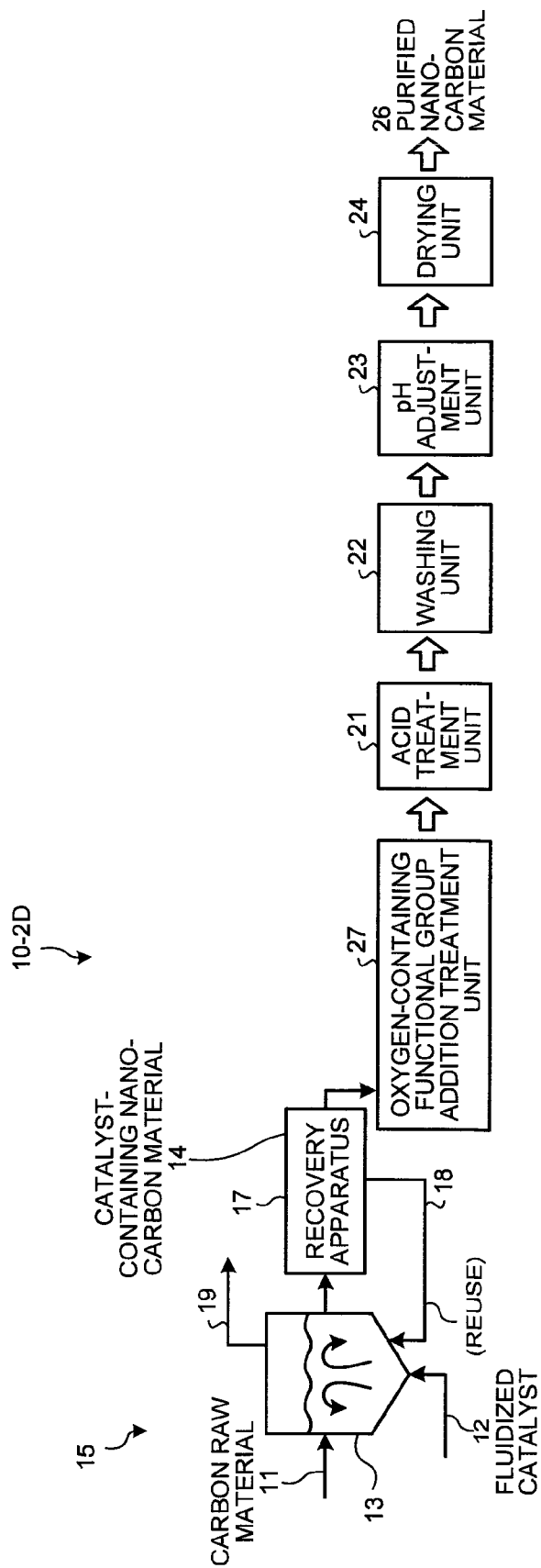
FIG. 10 is a schematic diagram of another nano-carbon material production apparatus according to the second embodiment for performing an oxygen-containing functional group addition treatment.

Furthermore, as illustrated in the nano-carbon material production apparatus 10-2D illustrated in FIG. 10, a pH adjustment unit 23 is further added to the nano-carbon material production apparatus 10-2A illustrated in FIG. 6, to cause the oxygen-containing functional groups on the alkaline side to dissociate. The electrostatic repulsion 31 produced by the dissociated oxygen-containing functional groups causes the distance between the nano-carbons to widen, thereby preventing agglomeration. Consequently, dissociation of the oxygen-containing functional groups added in the acid treatment proceeds further, resulting in the electrostatic repulsive force strengthening. As a result, the synergetic effect that the level of repulsion improves is exhibited.

Figure 11:
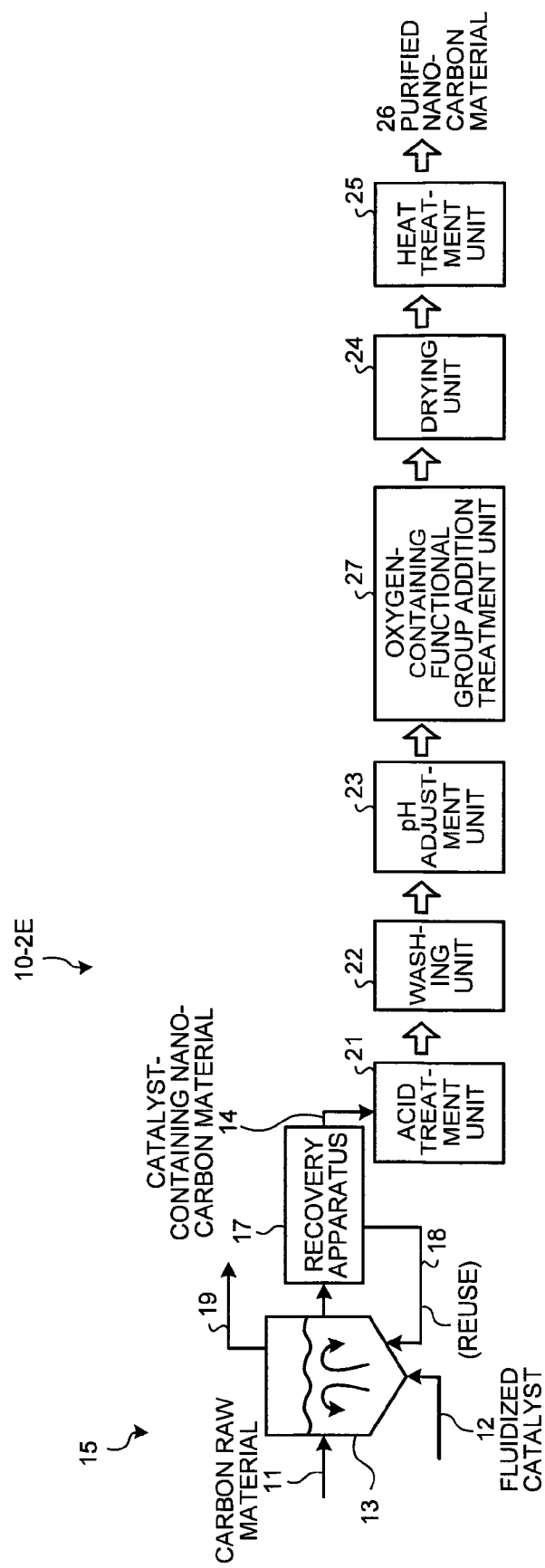
FIG. 11 is a schematic diagram of another nano-carbon material production apparatus according to the second embodiment for performing an oxygen-containing functional group addition treatment.

In addition, as illustrated in nano-carbon material production apparatus 10-2E illustrated in FIG. 11, the oxygen-containing functional group addition treatment unit 27 may be provided further on the downstream side of the pH adjustment unit 23 in the above-described nano-carbon material production apparatus 10-1A illustrated in FIG. 1 according to the first embodiment for preventing tangling of the carbon nanofibers by pH adjustment.

As a result, by adjusting the pH with the pH adjustment unit 23, the dissociated oxygen-containing functional groups electrostatically repel each other, causing the distance between the nano-carbons to widen, thereby preventing agglomeration. Moreover, by further adding the oxygen-containing functional groups with the oxygen-containing functional group addition treatment unit 27, the dissociation effect is increased. Then, with the pH on the alkaline side, the drying treatment is carried out with the drying unit 24, and agglomeration in the subsequent step of removing the alkali agent with the heat treatment unit 25 is prevented.

Third Embodiment

Figure 12:
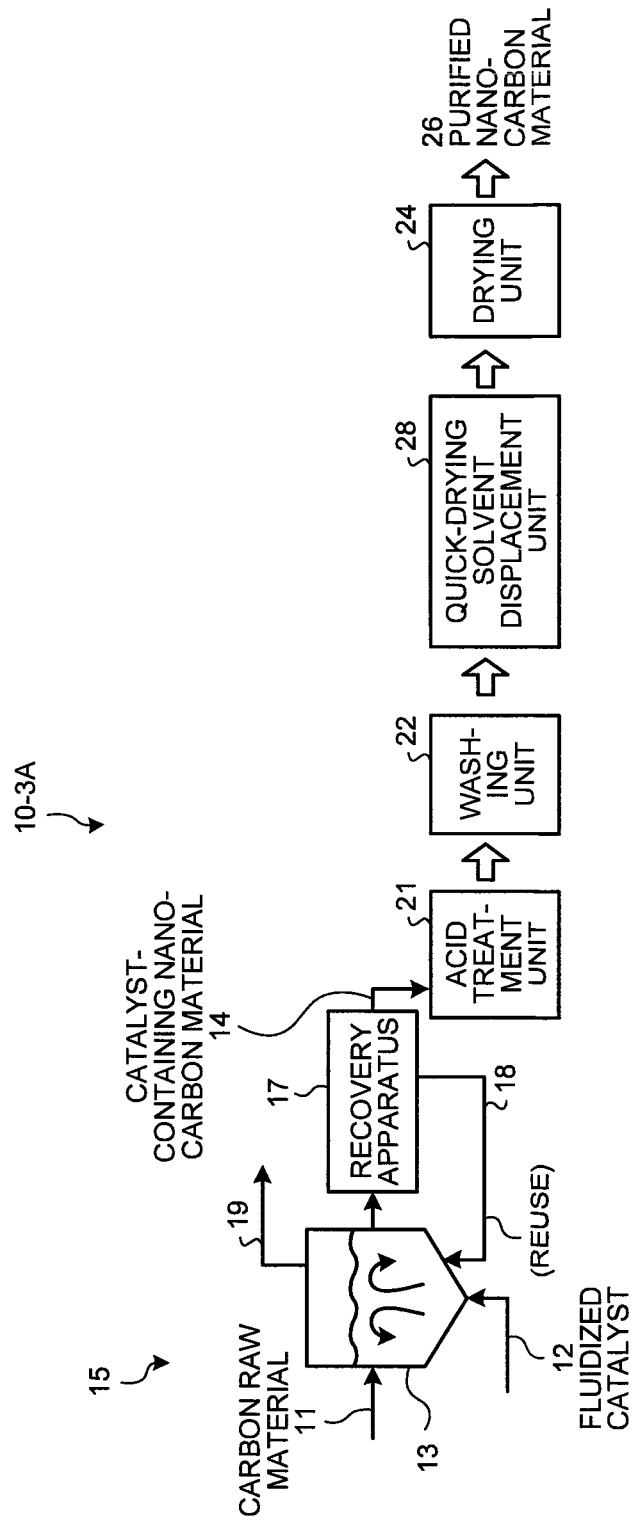
FIG. 12 is a schematic diagram of a nano-carbon material production apparatus according to a third embodiment for performing an oxygen-containing functional group addition treatment.

FIG. 12 illustrates a schematic diagram of a nano-carbon material production apparatus according to a third embodiment for performing a displacement treatment with a quick-drying solvent.

As illustrated in FIG. 12, a nano-carbon material production apparatus 10-3A according to the third embodiment includes a nano-carbon material production unit 15, an acid treatment unit 21, a washing unit 22, a quick-drying solvent displacement unit 28, and a drying unit 24. The nano-carbon material production unit 15 produces a catalyst-containing nano-carbon material 14 by a fluidized bed reactor 13. The acid treatment unit 21 dissolves and separates a fluidized catalyst 12, which is a granulated catalyst, by an acid solution by dispersing the obtained catalyst-containing nano-carbon material 14 in the acid solution. The washing unit 22 is provided on the downstream side of the acid treatment unit 21, and washes the acid-treated nano-carbon material with water. The quick-drying solvent displacement unit 28 is provided on the downstream side of the washing unit 22, and displaces with a quick-drying solvent. The drying unit 24 dries the nano-carbon material displaced with the quick-drying solvent to produce a purified nano-carbon material 26.

Consequently, the drying rate at the subsequent drying unit 24 improves, so that agglomeration among the nano-carbon material may be prevented.

Figure 13:
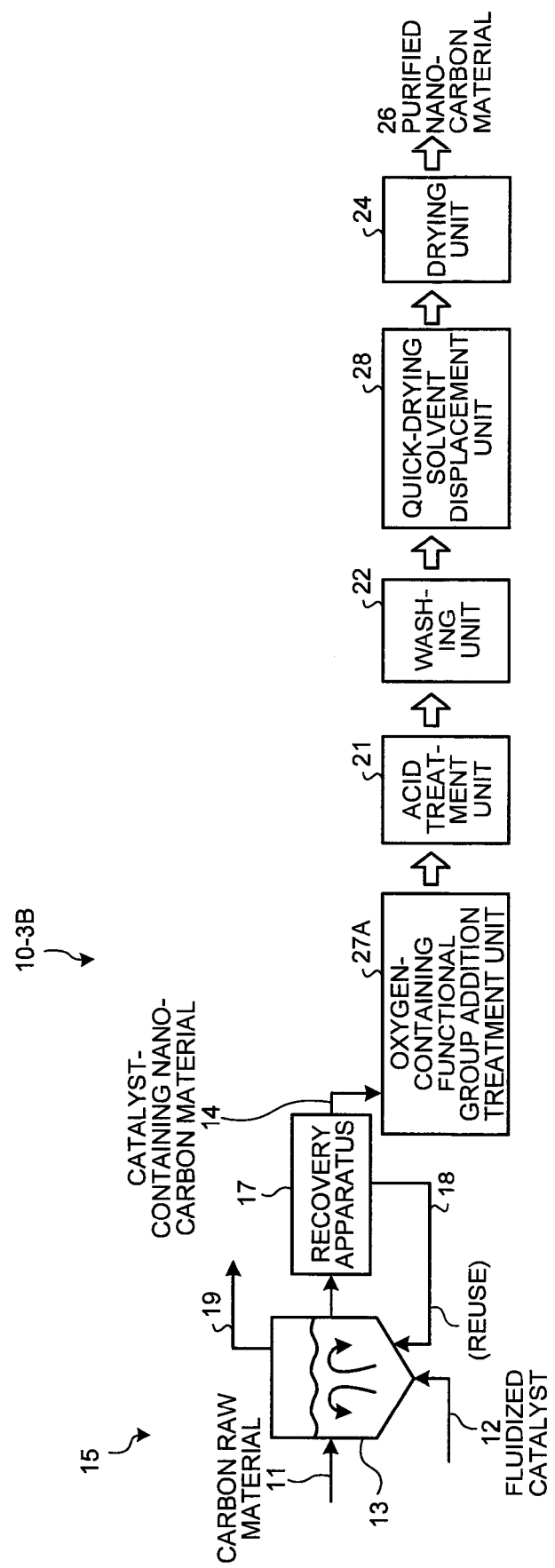
FIG. 13 is a schematic diagram of another nano-carbon material production apparatus according to the third embodiment for performing an oxygen-containing functional group addition treatment.

Furthermore, as illustrated in the nano-carbon material production apparatus 10-3B illustrated in FIG. 13, the quick-drying solvent displacement unit 28 may be provided on the downstream side of the washing unit 22 in the nano-carbon material production apparatus 10-2A illustrated in FIG. 6, so that the drying rate at the subsequent drying unit 24 improves and agglomeration among the nano-carbon material is also prevented.

Figure 14:
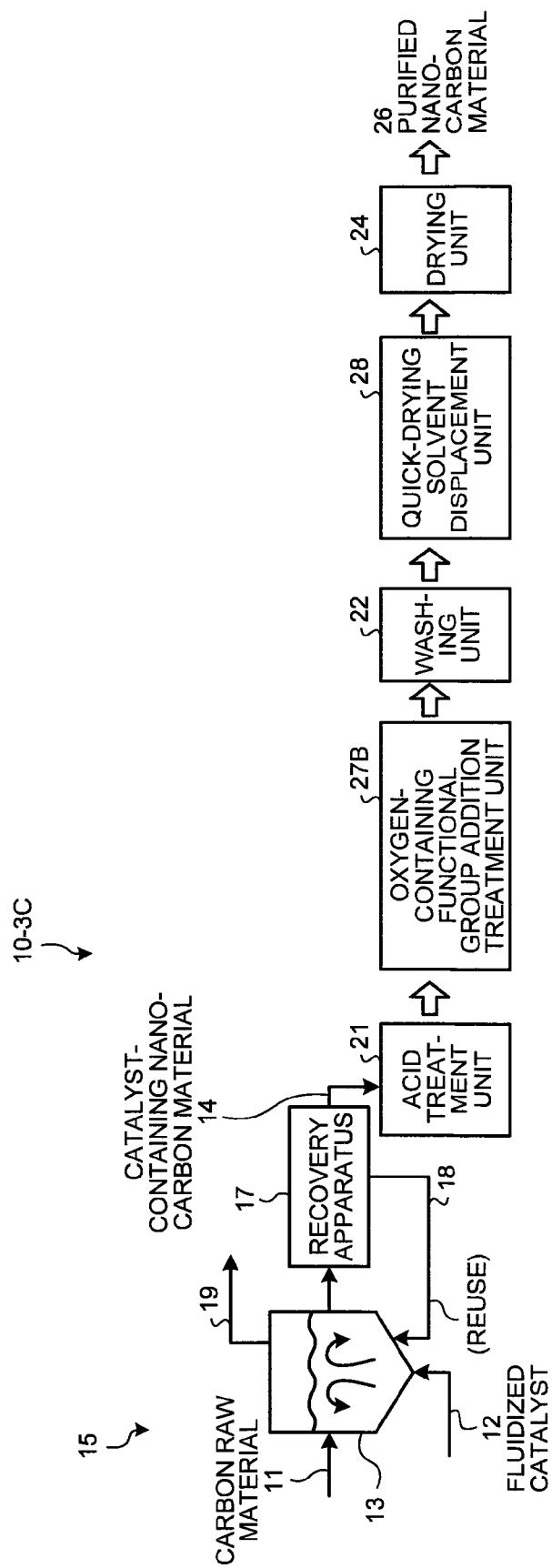
FIG. 14 is a schematic diagram of another nano-carbon material production apparatus according to the third embodiment for performing an oxygen-containing functional group addition treatment.

Furthermore, as illustrated in the nano-carbon material production apparatus 10-3C illustrated in FIG. 14, the quick-drying solvent displacement unit 28 may be provided on the downstream side of the washing unit 22 in the nano-carbon material production apparatus 10-2B illustrated in FIG. 8, so that the drying rate at the subsequent drying unit 24 improves and agglomeration among the nano-carbon material is also prevented.

Figure 15:
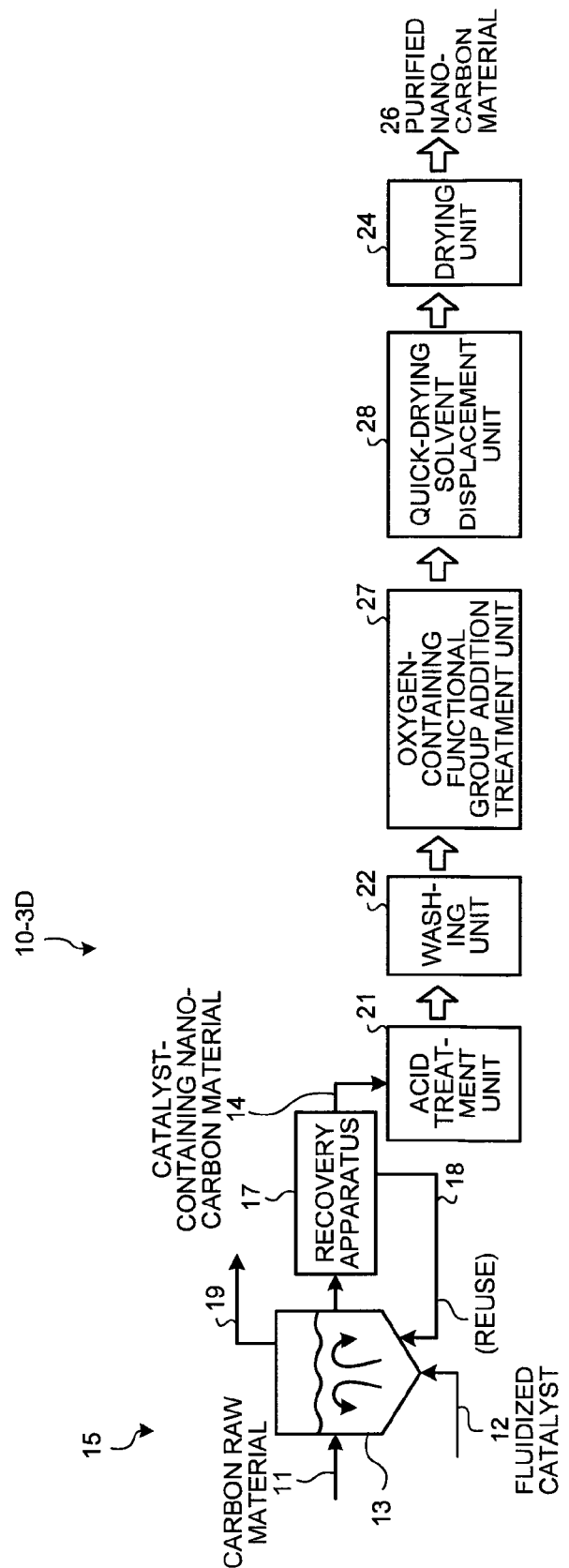
FIG. 15 is a schematic diagram of another nano-carbon material production apparatus according to the third embodiment for performing an oxygen-containing functional group addition treatment.

Furthermore, as illustrated in the nano-carbon material production apparatus 10-3D illustrated in FIG. 15, the quick-drying solvent displacement unit 28 may be provided on the downstream side of the oxygen-containing functional group addition treatment unit 27 in the nano-carbon material production apparatus 10-2C illustrated in FIG. 9, so that the drying rate at the subsequent drying unit 24 improves and agglomeration among the nano-carbon material is also prevented.

Fourth Embodiment

Figure 16:
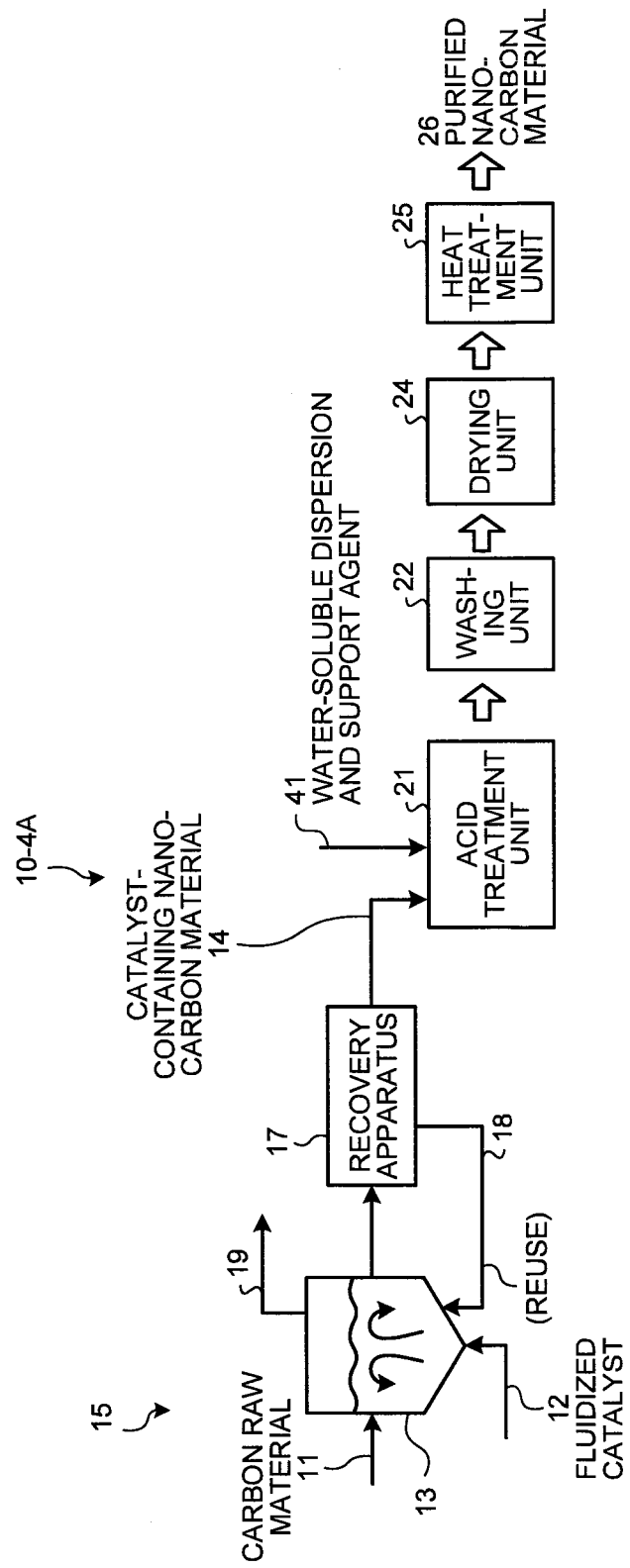
FIG. 16 is a schematic diagram of a nano-carbon material production apparatus according to a fourth embodiment for feeding a water-soluble dispersion and support agent in an acid treatment.
Figure 17:
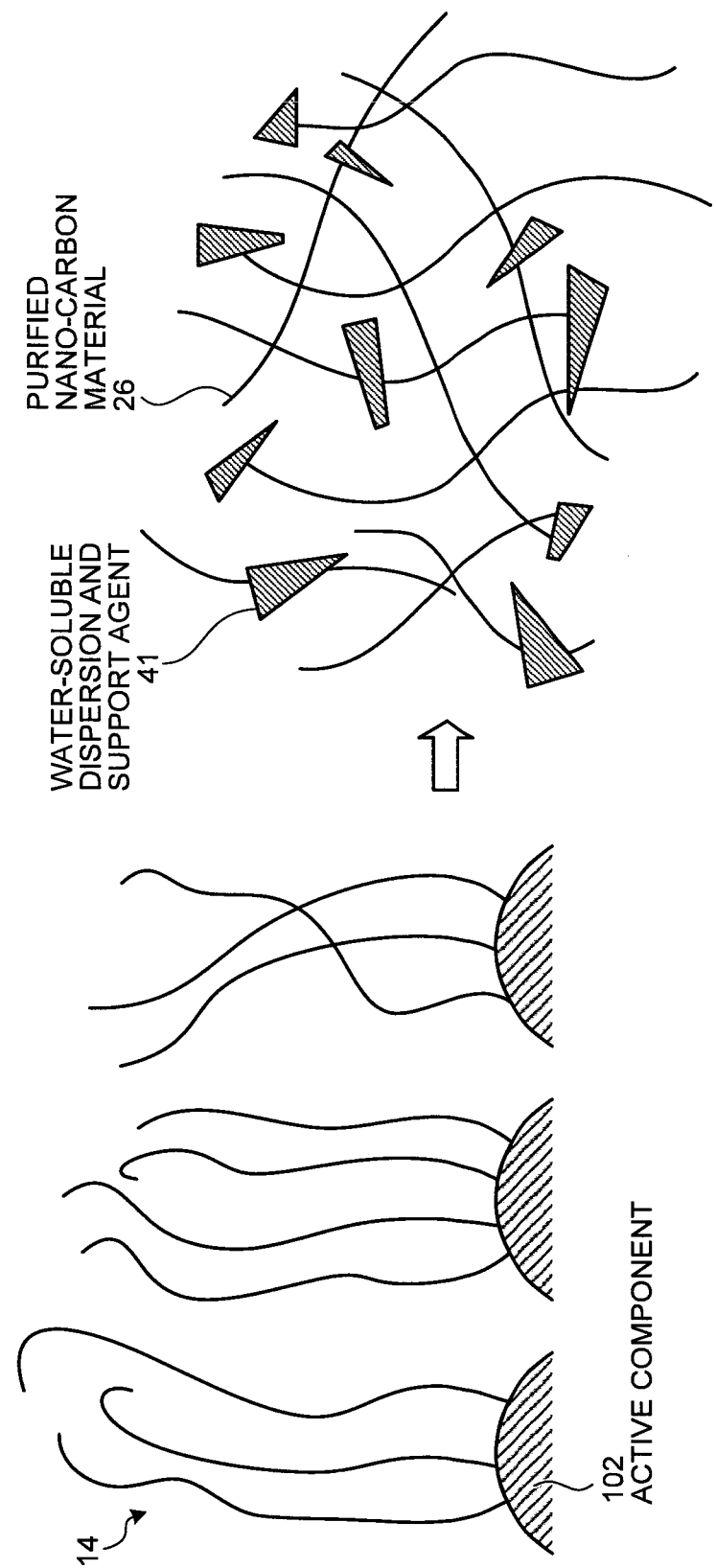
FIG. 17 is a schematic diagram of an acid treatment using a water-soluble dispersion and support agent.

FIG. 16 is a schematic diagram of a nano-carbon material production apparatus according to a fourth embodiment for feeding a water-soluble dispersion and support agent in an oxygen treatment. FIG. 17 is a schematic diagram of an acid treatment using a water-soluble dispersion and support agent.

As illustrated in FIG. 16, a nano-carbon material production apparatus 10-4A according to the fourth embodiment includes: a nano-carbon material production unit 15 for producing a catalyst-containing nano-carbon material 14 by a fluidized bed reactor 13; and an acid treatment unit 21 for dissolving and separating a fluidized catalyst 12, which is a granulated catalyst, by an acid solution by dispersing the obtained catalyst-containing nano-carbon material 14 in the acid solution. A water-soluble dispersion and support agent 41 is fed by the acid treatment unit 21.

This water-soluble dispersion and support agent 41 disperses and supports the nano-carbon material to suppress agglomeration among the nano-carbon material isolated from the active metal component by the acid.

Subsequently, the agglomeration-suppressed nano-carbon material is washed by the washing unit 22 with water, and then dried by the drying unit 24. The water-soluble dispersion and support agent 41 is then heat treated at a high temperature (for example, 700 to 1,100° C.) in the heat treatment unit 25 to carry out pyrolysis and removal, whereby a purified nano-carbon material 26 is obtained.

Here, when only a nano-carbon material in which a carrier and an active component are dissolved in an acid solution is isolated, the water-soluble dispersion and support agent 41 added into the acid treatment unit 21 supports that nano-carbon material.

More specifically, for the catalyst-containing nano-carbon material 14 fed into an acid solution, the active component and the carrier, which constitute the catalyst, are dissolved by the acid in the acid treatment unit 21 to form an isolated nano-carbon material which floats in the acid solution. During this process, as illustrated in FIG. 17, if the water-soluble dispersion and support agent 41 dissolved in an acid solution is present, the water-soluble dispersion and support agent 41 intercalates among the purified nano-carbon material 26. Consequently, contact among the nano-carbon material is suppressed, so that agglomeration among the nano-carbon material is suppressed.

Thus, although the nano-carbon material which has grown from the active component becomes free from the catalyst active component during the acid treatment, at that point the water-soluble dispersion and support agent 41 intercalates thereamong. Consequently, the nano-carbon material is transferred to the water-soluble dispersion and support agent 41, whereby agglomeration is suppressed.

In the present invention, it is preferred to use as the water-soluble dispersion and support agent 41 a material having both a hydrophobic group, which easily associates with the hydrophobic group of the nano-carbon material, and a hydrophilic group. Therefore, it is preferred to use one of a resin compound, a surfactant, a polysaccharide, and an anti-agglomeration agent having these properties or a combination thereof. Furthermore, optionally, a dispersion auxiliary may also be added.

Examples of the resin compound include polyethylene glycol (PEG), polyethylene oxide (PEO), and polycarbonate (PC).

It is especially preferred to use an equivalent resin, or a resin having similar properties, to the resin used in the product in which the nano-carbon material will be dispersed, because there is no need to eliminate the resin compound.

Furthermore, as the surfactant, any of an anionic surfactant, a cationic surfactant, an amphoteric surfactant, and a nonionic surfactant may be used. Examples include inorganic acid esters, cyclic ethers, carboxylic acid anhydrides, dicarboxylic acids, aliphatic carboxylic acids, unsaturated carboxylic acids, alicyclic ketones, alicyclic alcohols, aliphatic alcohols, aliphatic chlorinated compounds, aliphatic amines, aliphatic nitriles, unsaturated fatty acids, carboamides, aromatic polyamides, azo compounds, pyrene functionalized block copolymers, cellulose derivatives, long chain benzenediazonium, glucose oxidase, alicyclic nitrile compounds, quinoid compounds, polyols, diols, diamines, dienes and the like.

Examples of the polysaccharide include xanthan gum, starch, amylose, amylopectin, glycogen, cellulose, chitin, agarose, carrageenan, heparin, hyaluronic acid, pectin, and xyloglucan.

Examples of the anti-agglomeration agent include polyaniline sulfonic acid (PAS).

Figure 18:
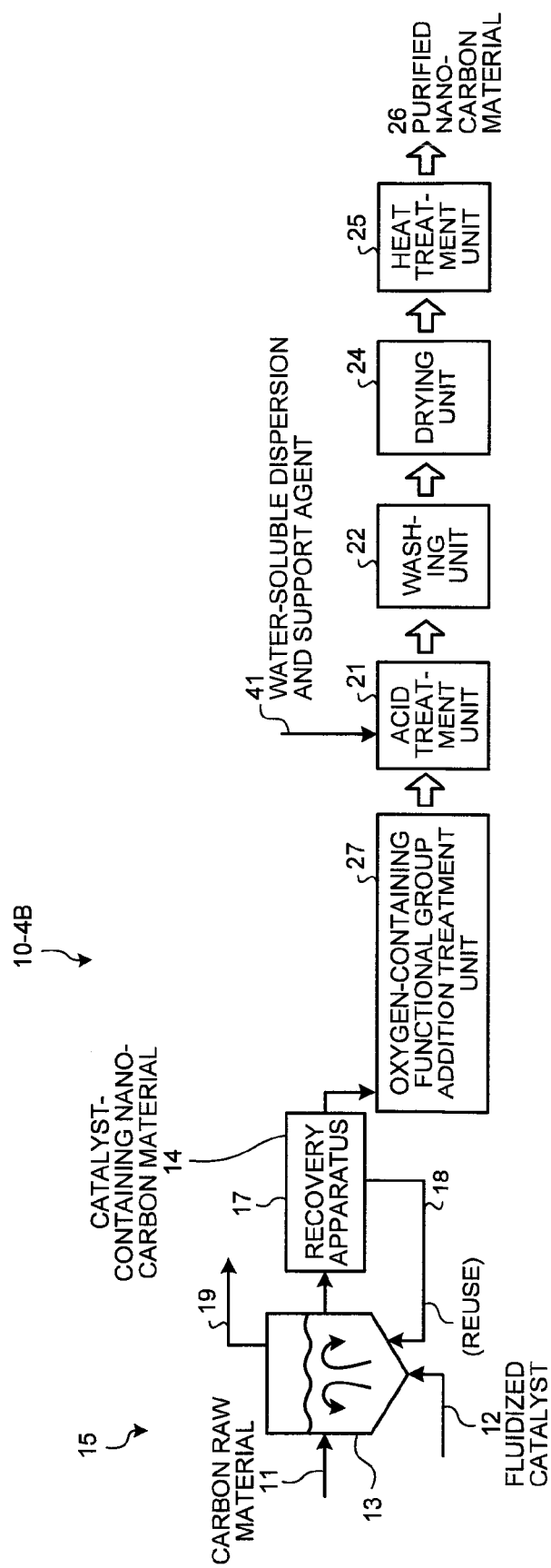
FIG. 18 is a schematic diagram of another nano-carbon material production apparatus according to the fourth embodiment for feeding a water-soluble dispersion and support agent in an acid treatment.

FIG. 18 illustrates a schematic diagram of another nano-carbon material production apparatus according to the present embodiment. As illustrated in FIG. 18, a nano-carbon material production apparatus 10-4B according to the present embodiment further has the oxygen-containing functional group addition treatment unit 27 for adding an oxygen-containing functional group to the obtained catalyst-containing nano-carbon material 14 on the upstream side of the acid treatment unit 21 in the nano-carbon material production apparatus 10-4A illustrated in FIG. 16.

Here, the oxygen-containing functional group addition treatment unit 27 is not especially limited, as long as it is means for adding, or causing to be added, an oxygen-containing functional group onto the surface of the nano-carbon material. Either or both of the above-described physical treatments and chemical treatments may be used to carry this out.

Fifth Embodiment

Figure 19:
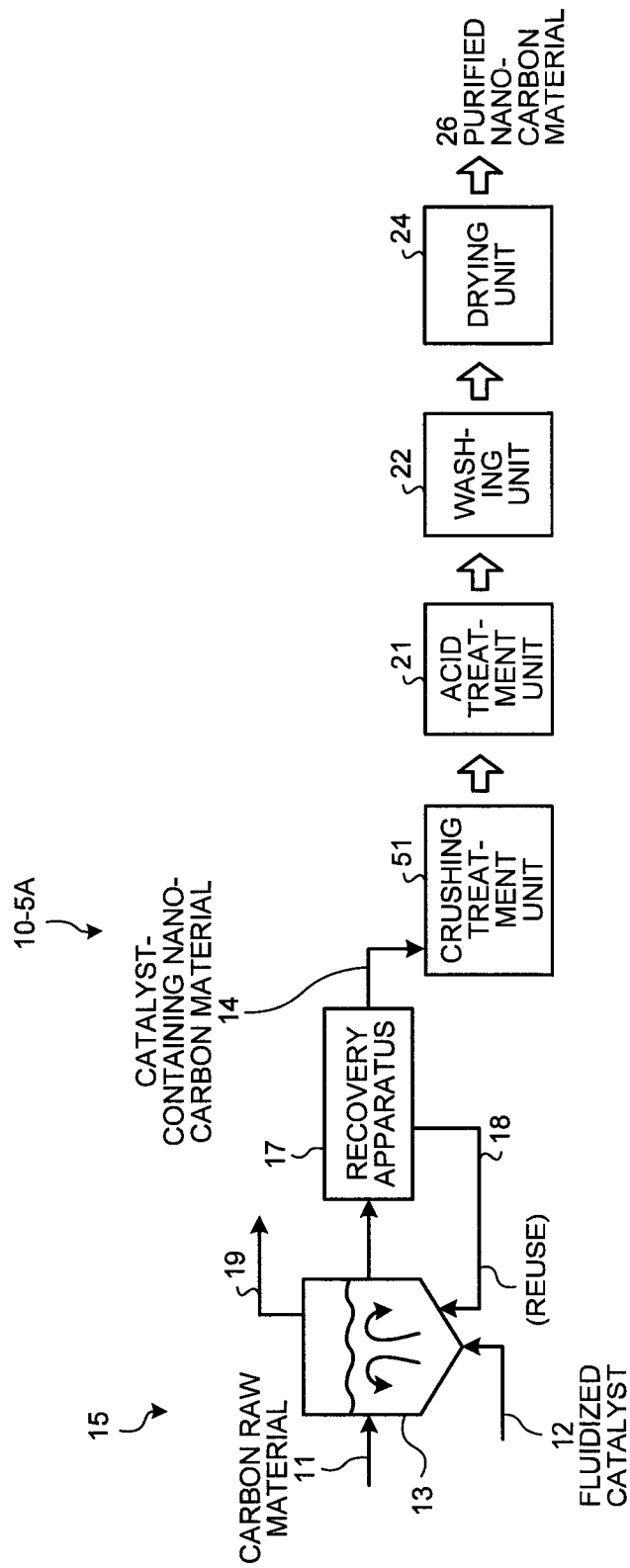
FIG. 19 is a schematic diagram of a nano-carbon material production apparatus according to a fifth embodiment for performing a crushing treatment before an acid treatment.
Figure 20:
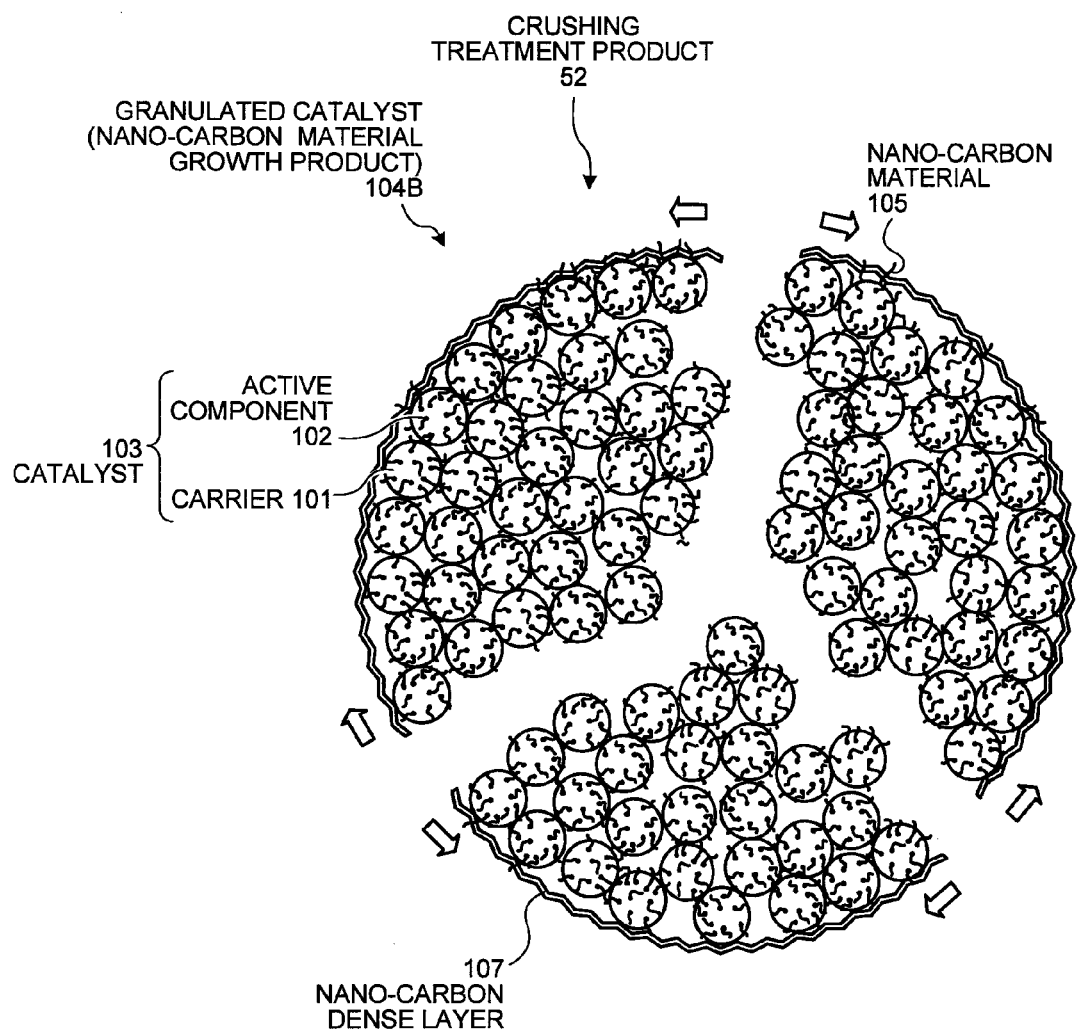
FIG. 20 is a schematic diagram illustrating crushing of a catalyst granular material formed of secondary particles.

FIG. 19 is a schematic diagram of a nano-carbon material production apparatus according to a fifth embodiment for performing a crushing treatment before an acid treatment. FIG. 20 is a schematic diagram illustrating crushing of a catalyst granular material formed of secondary particles.

As illustrated in FIG. 19, a nano-carbon material production apparatus 10-5A according to the fifth embodiment includes a nano-carbon material production unit 15, an acid treatment unit 21, a crushing treatment unit 51, a washing unit 22, and a drying unit 24. The nano-carbon material production unit 15 produces a catalyst-containing nano-carbon material 14 by a fluidized bed reactor 13. The acid treatment unit 21 dissolves and separates a fluidized catalyst 12, which is a granulated catalyst, by an acid solution by dispersing the obtained catalyst-containing nano-carbon material 14 in the acid solution. The crushing treatment unit 51 is provided on the upstream side of the acid treatment unit 21, and crushes a nano-carbon dense layer formed by aggregation of the nano-carbon formed on the surface of a secondary particle formed from aggregation of catalyst primary particles which are the growth nano-carbon material. The washing unit 22 is provided on the downstream side of the acid treatment unit 21, and washes the acid-treated nano-carbon material with water. The drying unit 24 dries the washed nano-carbon material.

As illustrated in FIG. 20, by providing the crushing treatment unit 51, the nano-carbon dense layer 107 (refer to FIG. 40) formed on the surface of the secondary particles, which are the granulated catalyst 104B, is crushed. Consequently, the catalyst primary particles which are the grown nano-carbon material 105 present in the interior and which are derived from the broken up crushing treatment product 52 are well dispersed. As a result, the yield of effective nano-carbon can be improved and the carbon bulk density can be reduced.

In the present embodiment, although the crushing treatment unit 51 is provided on the upstream side of the acid treatment unit 21, the crushing treatment may also be carried out simultaneously with the treatment in the acid treatment unit 21.

Here, the crushing treatment unit 51 adds a shearing or a crushing action on the granulated catalyst before or during the acid treatment, so that the nano-carbon dense layer agglomerated on the catalyst surface can be effectively crushed.

Examples of the crushing treatment unit 51 include a ball mill, a high shear stirrer (for example, "T. K. Homomixer" (trade name, manufactured by Primix Corporation), "Ultra-Turrax" (trade name, manufactured by IKA Japan K.K.)) and the like.

Furthermore, since the crushed nano-carbon dense layer 107 includes materials which cannot be used as nano-carbon, an impurity removal unit can be provided so that only effective nano-carbon material is obtained. This impurity removal unit may use various separation means, such as centrifugal separation means, sieve means, electrophoretic means, and air classification means.

Figure 21:
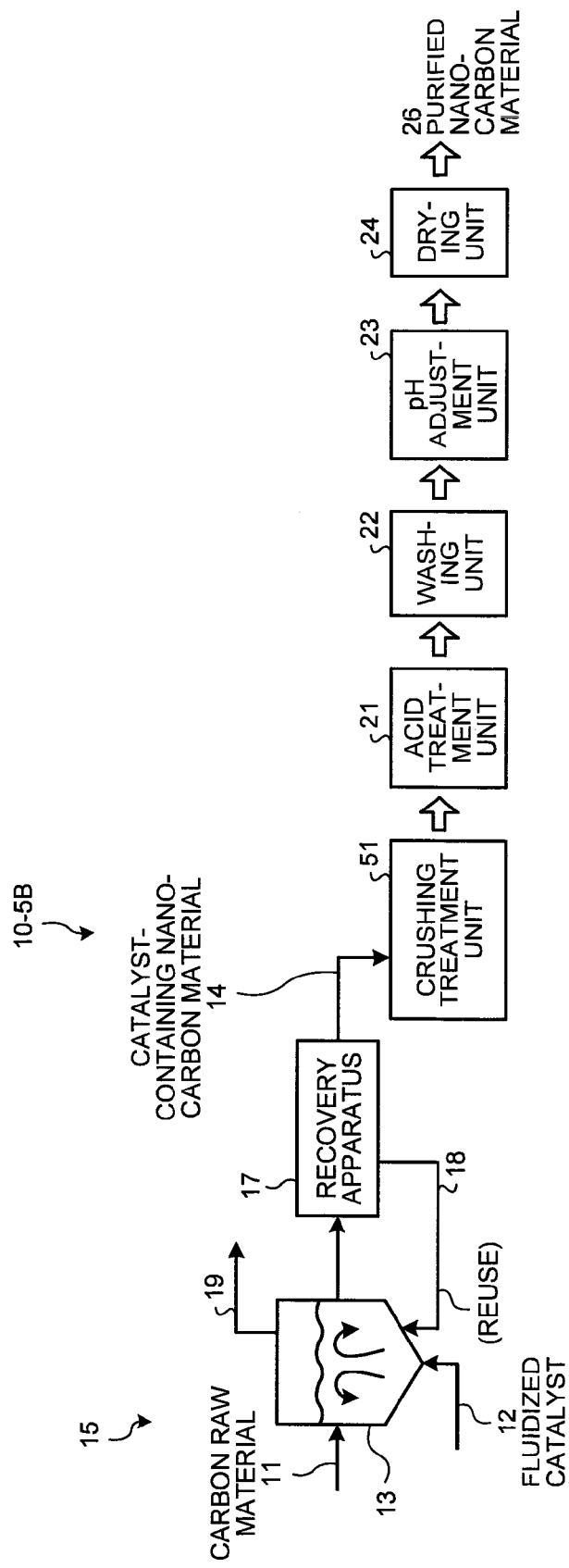
FIG. 21 is a schematic diagram of another nano-carbon material production apparatus according to the fifth embodiment for performing a crushing treatment before an acid treatment.

FIG. 21 illustrates a schematic diagram of another nano-carbon material production apparatus according to a fifth embodiment for performing a crushing treatment before an acid treatment.

As illustrated in FIG. 21, a nano-carbon material production apparatus 10-5B according to the present embodiment is further provided with a pH adjustment unit 23 on the downstream side of the washing unit 22, in the nano-carbon material production apparatus 10-5A illustrated in FIG. 19.

Consequently, in addition to the effective crushing of the nano-carbon dense layer agglomerated on the catalyst surface as a result of adding a shearing or a crushing action on the granulated catalyst, the pH adjustment causes the oxygen-containing functional groups, such as a hydroxyl group (—OH) or a carboxyl group (—COOH), of the nano-carbon to dissociate. These dissociated oxygen-containing functional groups electrostatically repel 31 each other, which causes the distance between the nano-carbons to widen, whereby agglomeration can be prevented.

Figure 22:
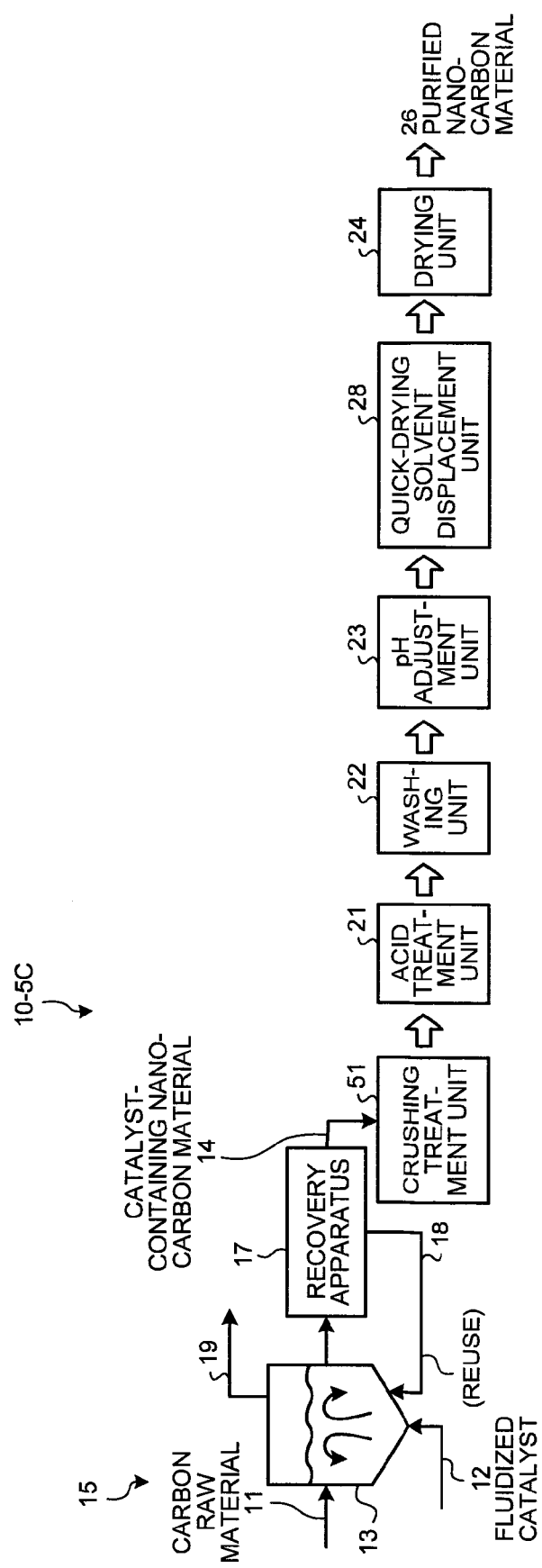
FIG. 22 is a schematic diagram of another nano-carbon material production apparatus according to the fifth embodiment for performing a crushing treatment before an acid treatment.

FIG. 22 illustrates a schematic diagram of another nano-carbon material production apparatus according to the fifth embodiment for performing a crushing treatment before an acid treatment.

As illustrated in FIG. 22, a nano-carbon material production apparatus 10-5C according to the fifth embodiment is provided with a quick-drying solvent displacement unit 28 on the downstream side of the pH adjustment unit 23, in the nano-carbon material production apparatus 10-5B illustrated in FIG. 21.

Consequently, by displacing with, for example, acetone, which is a quick-drying solvent, the drying rate at the subsequent drying unit 24 improves, so that agglomeration among the nano-carbon material is further prevented.

Sixth Embodiment

Figure 23:
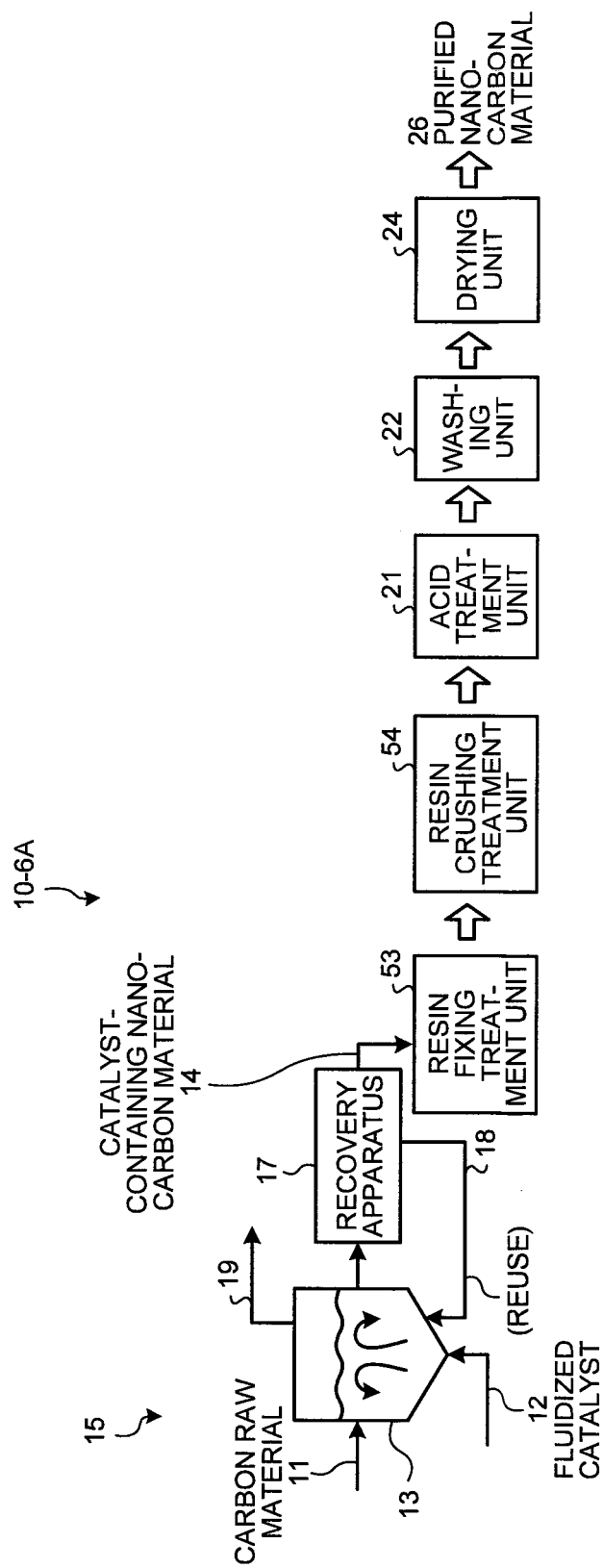
FIG. 23 is a schematic diagram of a nano-carbon material production apparatus according to a sixth embodiment for performing a crushing treatment using a resin before an acid treatment.
Figure 24:
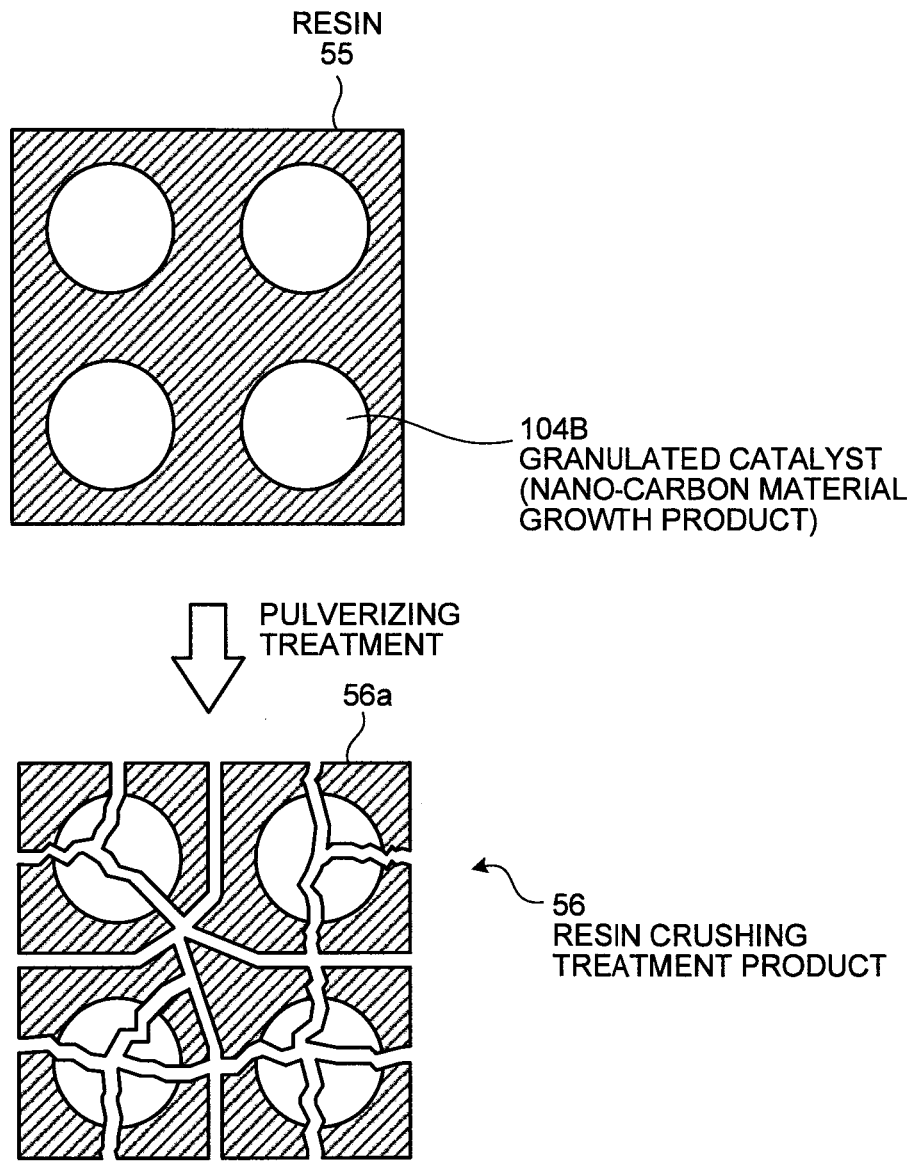
FIG. 24 is a schematic diagram illustrating crushing of a catalyst granular material, formed of secondary particles, by a resin.
Figure 25:
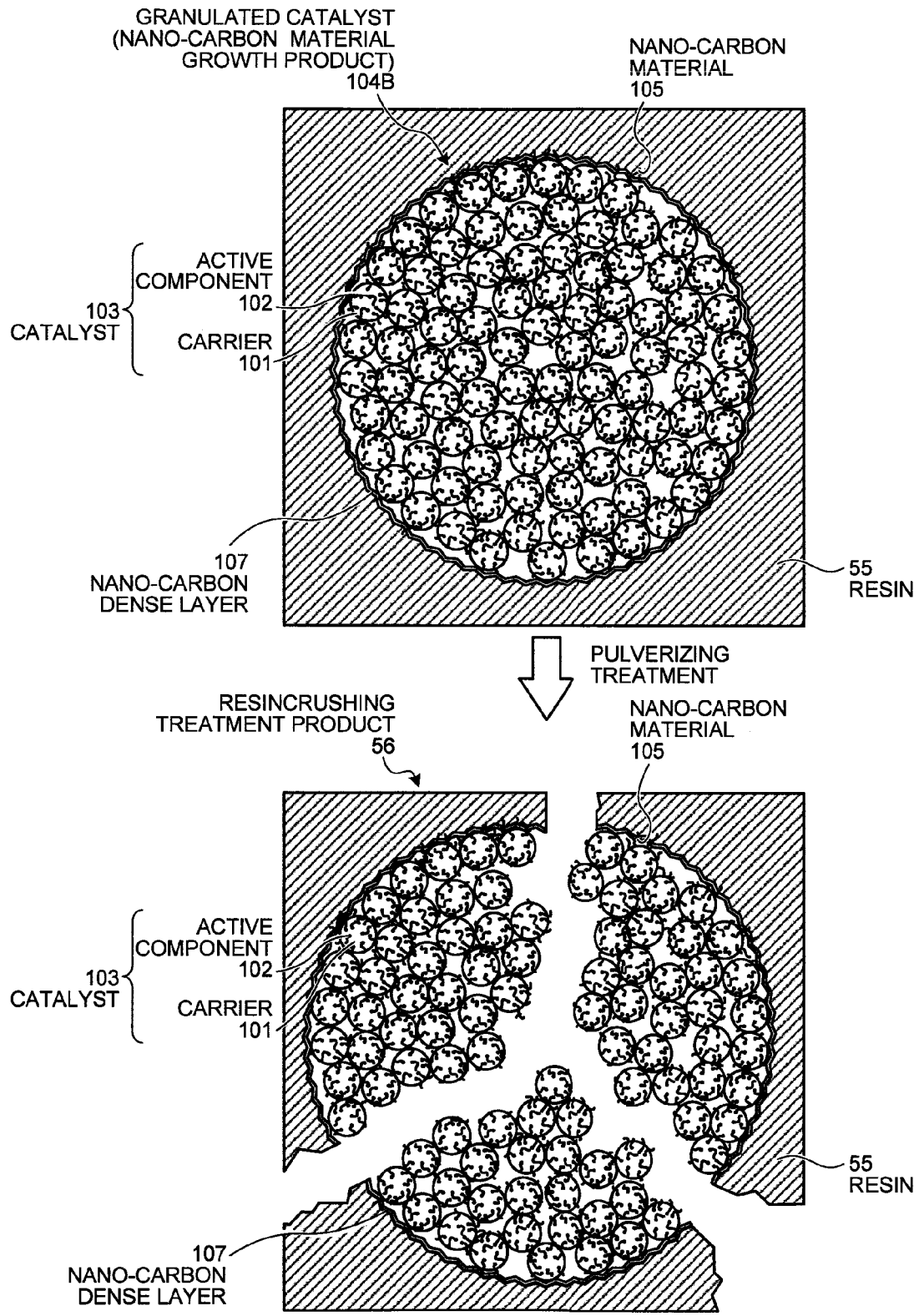
FIG. 25 is a schematic diagram illustrating the crushing of a single unit of a catalyst granular material, formed of secondary particles, along with a resin.

FIG. 23 illustrates a schematic diagram of a nano-carbon material production apparatus according to a sixth embodiment for performing a crushing treatment using a resin before an acid treatment. FIG. 24 is a schematic diagram illustrating crushing of a catalyst granular material, formed of secondary particles, by a resin. FIG. 25 is a schematic diagram illustrating the crushing of a single unit of a catalyst granular material, formed of secondary particles, along with a resin.

As illustrated in FIG. 23, a nano-carbon material production apparatus 10-6A according to the sixth embodiment includes a nano-carbon material production unit 15, a resin fixing treatment unit 53, a resin crushing treatment unit 54, an acid treatment unit 21, a washing unit 22, and a drying unit 24. The nano-carbon material production unit 15 produces a catalyst-containing nano-carbon material 14 by a fluidized bed reactor 13. The resin fixing treatment unit 53 fixes with a resin the periphery of a granulated catalyst having a nano-carbon dense layer formed by aggregation of the nano-carbon formed on the surface of a secondary particle formed from aggregation of catalyst primary particles which are the growth nano-carbon material. The resin crushing treatment unit 54 crushes the resin fixing the nano-carbon dense layer by crushing the catalyst-containing granular material fixed by the resin along with the resin. The acid treatment unit 21 dissolves and separates a catalyst by an acid solution by feeding the catalyst-containing nano-carbon material 14 crushed along with the resin into the acid solution. The washing unit 22 is provided on the downstream side of the acid treatment unit 21, and washes the acid-treated nano-carbon material with water. The drying unit 24 dries the washed nano-carbon material.

Here, since the nano-carbon dense layer is formed on the surface of secondary particles, when fixed with a resin the nano-carbon dense layer is fixed preferentially to the nano-carbon or carbon nanotubes having excellent dispersibility which have grown in the interior of the secondary particles.

By providing a resin step treatment unit, as illustrated in FIG. 24, the periphery of the nano-carbon dense layer (not illustrated) formed on the surface of a secondary particle, which is the granulated catalyst 104B, is coated by a resin 55. Subsequently, this resin 55 is crushed by the resin crushing treatment unit 54 to produce a resin crushing treatment product 56. Thus, the catalyst primary particles which are the grown nano-carbon material present in the interior of a broken up crushed piece 56a are well dispersed. Consequently, the yield of effective nano-carbon can be improved and the carbon bulk density can be reduced. FIG. 24 is a schematic diagram illustrating the fixing of a granulated catalyst by the resin. However, in actual fact, countless granulated catalyst particles are fixed by the resin.

As illustrated in the schematic diagram of FIG. 25, the periphery of the granulated catalyst 104B is fixed by a resin for a single unit of the granulated catalyst 104B. Subsequently, in the crushing treatment, this granulated catalyst 104B is turned into the resin crushing treatment product 56 broken into many pieces. Thus, the catalyst primary particles which are the grown nano-carbon material 105 present in the interior of the crushed piece 56a are well dispersed.

Examples of the fixing resin include an epoxy resin, polycarbonate, polyethylene, polypropylene, polyurethane, polyester, polystyrene, a urea resin, a phenol resin, and a vinyl resin.

It is especially preferred to use an equivalent resin, or a resin having similar properties, to the resin used in the product in which the nano-carbon material will be dispersed, because there is no need to eliminate or remove the resin compound.

It is preferred to use the resin crushing treatment unit 54 while cooling with liquid nitrogen, liquid air and the like.

Furthermore, a weakening agent for weakening the resin may be pre-added to the resin to make the resin more brittle, thereby facilitating crushing.

Examples of the weakening agent include sand, silica, silica sand, and alumina.

Since the weakening agent becomes an impurity, it is preferred to add as little an amount as possible.

In addition, examples of the resin crushing treatment unit 54 include a ball mill, a high shear stirrer (for example, "T. K. Homomixer" (trade name, manufactured by Primix Corporation), "Ultra-Turrax" (trade name, manufactured by IKA Japan K.K.)) and the like.

Figure 26:
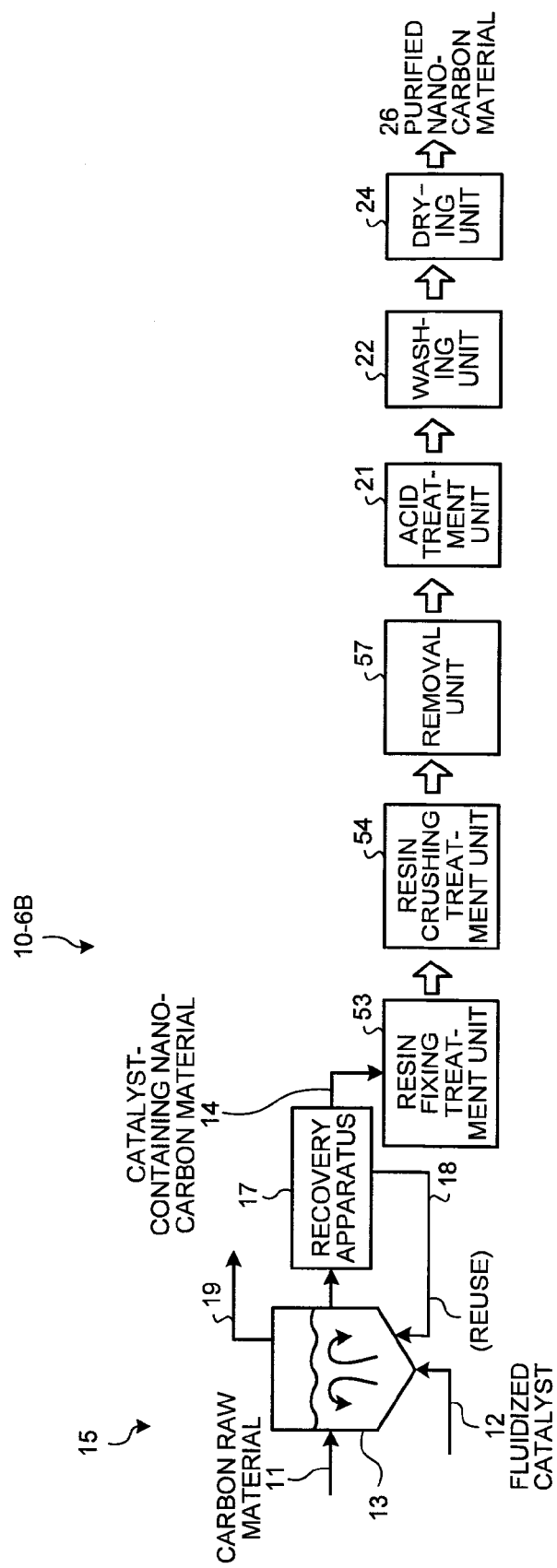
FIG. 26 is a schematic diagram of another nano-carbon material production apparatus according to the sixth embodiment for performing a crushing treatment using a resin before an acid treatment.

Furthermore, since the nano-carbon dense layer 107 crushed along with the resin includes materials which cannot be used as nano-carbon, as illustrated in the nano-carbon material production apparatus 10-6B of FIG. 26, a removal unit 57 for removing the nano-carbon dense layer fixed to the crushed resin may be provided on the downstream side of the resin crushing treatment unit 54 so that only effective nano-carbon material is obtained. In addition to providing this removal unit 57 on the downstream side of the resin crushing treatment unit 54, the removal unit 57 may also be provided on the downstream side of the drying unit 24.

Examples of the removal unit 57 include various separation and removal means, such as centrifugal separation means, sieve means, electrophoretic means, and air classification means.

During this process, in addition to removal of pieces of simultaneously crushed resin, the nano-carbon dense layer fixed to the resin is also removed along with the resin pieces.

Seventh Embodiment

Figure 27:
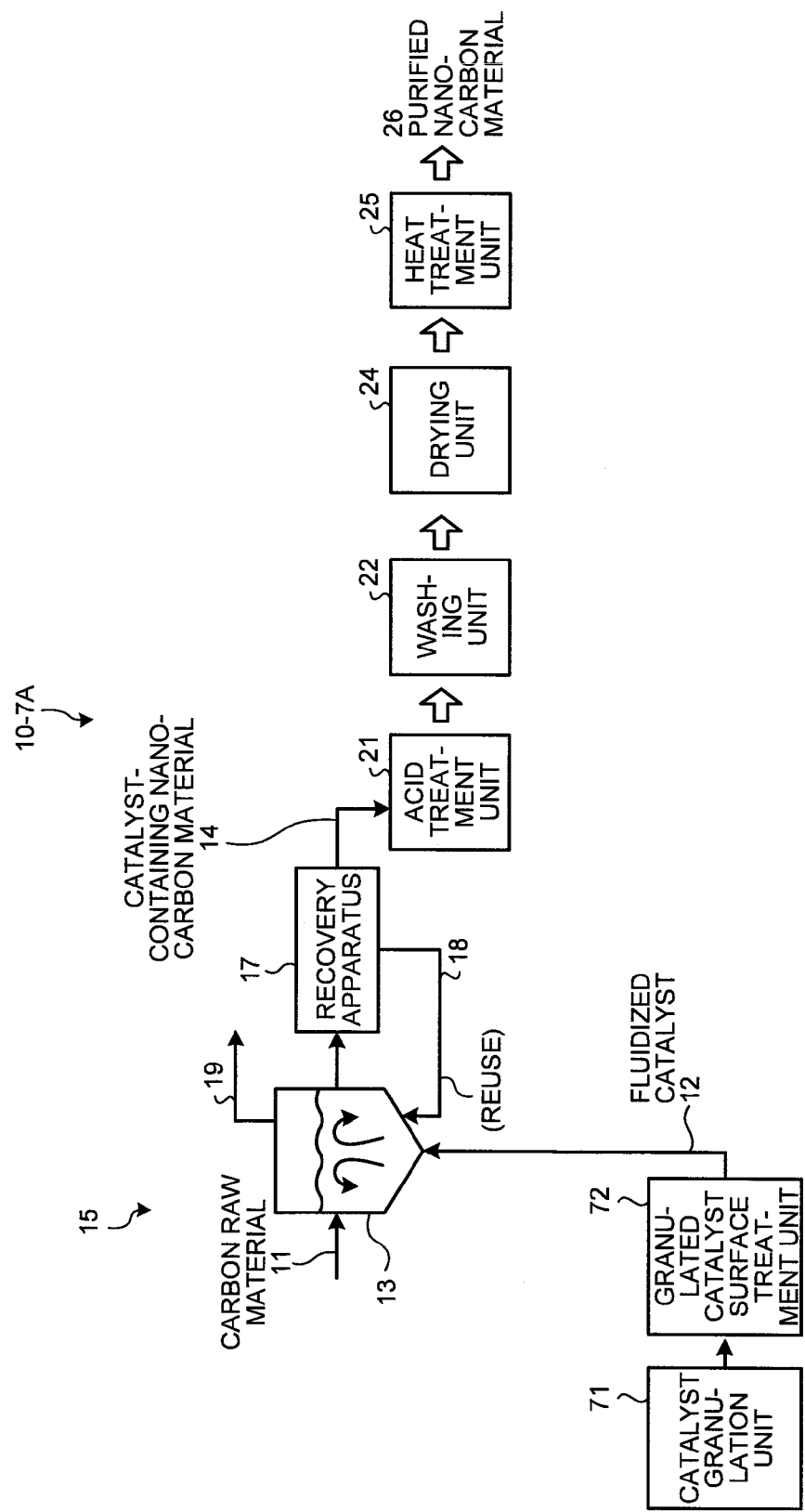
FIG. 27 is a schematic diagram of a nano-carbon material production apparatus according to a seventh embodiment for performing a pre-treatment on a granulated catalyst.
Figure 28:
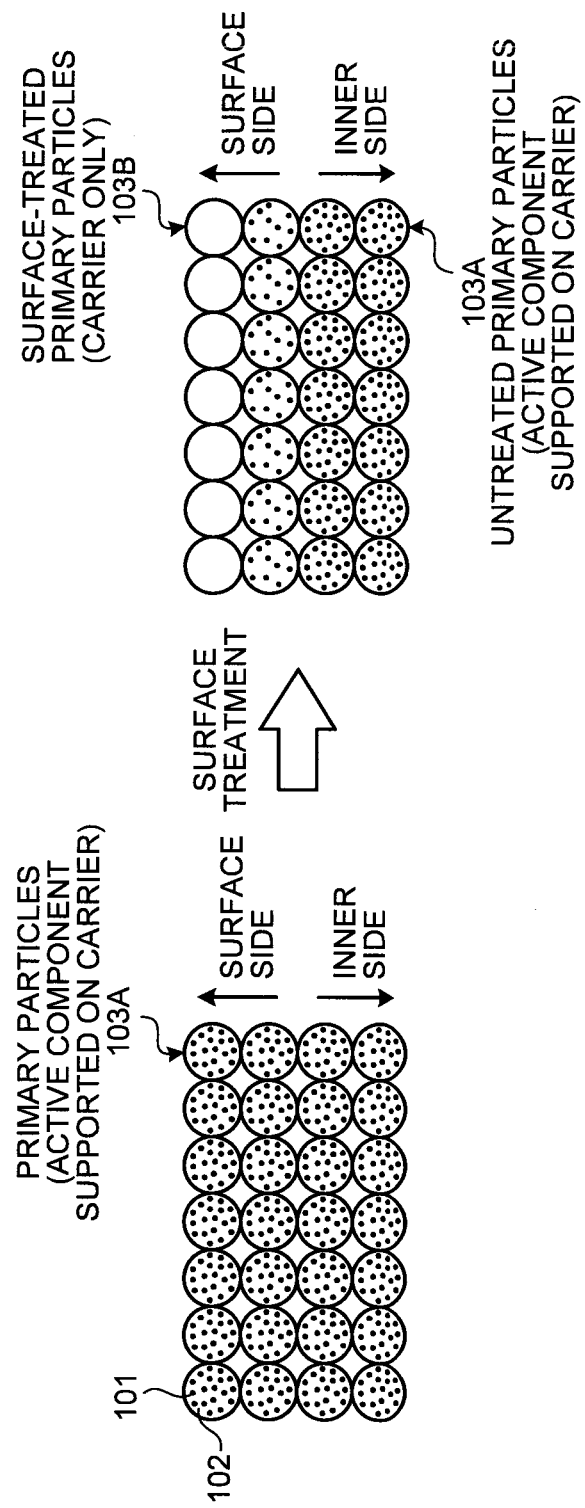
FIG. 28 is a schematic diagram of a pre-treatment state of the granulated catalyst.
Figure 29:
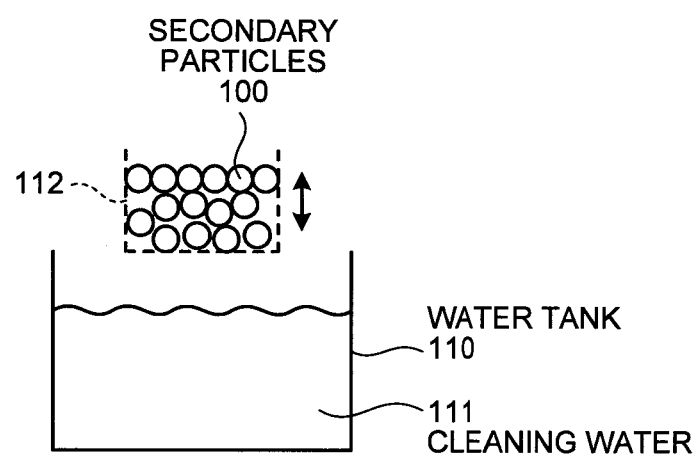
FIG. 29 is a schematic diagram of a surface treatment apparatus for a secondary particle outermost layer.
Figure 30:
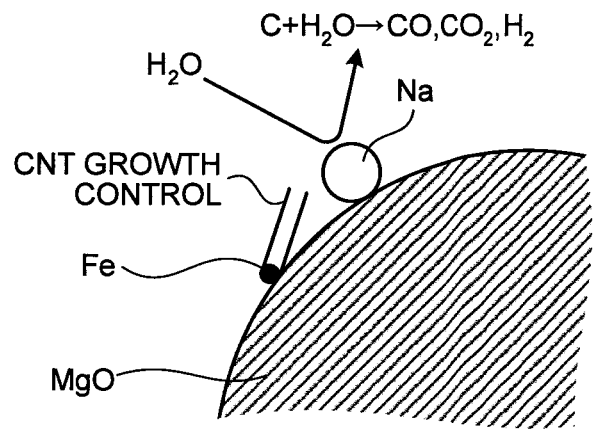
FIG. 30 is a schematic diagram of surface treatment of the outermost layer of a secondary particle.

FIG. 27 illustrates a schematic diagram of a nano-carbon material production apparatus according to a seventh embodiment for performing a pre-treatment on a granulated catalyst. FIG. 28 is a schematic diagram of a pre-treatment state of the granulated catalyst. FIG. 29 is a schematic diagram of surface treatment of the outermost layer of a secondary particle. FIG. 30 is a schematic diagram of another surface treatment apparatus for a secondary particle outermost layer.

As illustrated in FIG. 27, a nano-carbon material production apparatus 10-7A according to the present embodiment includes a catalyst granulation unit 71, a granulated catalyst surface treatment unit 72, a nano-carbon material production unit 15, an acid treatment unit 21, a washing unit 22, and a drying unit 24. The catalyst granulation unit 71 obtains a granulated catalyst by granulating a carrier supporting an active component. The granulated catalyst surface treatment unit 72 treats the surface of the granulated catalyst to decrease or reduce to zero the ratio of active component on the surface of the primary particles present in the outermost layer of the granulated catalyst. The nano-carbon material production unit 15 produces a catalyst-containing nano-carbon material 14 by a fluidized bed reactor 13 using a surface-treated fluidized catalyst 12. The acid treatment unit 21 dissolves and separates a catalyst by an acid solution by feeding the catalyst-containing nano-carbon material 14 into the acid solution. The washing unit 22 is provided on the downstream side of the acid treatment unit 21, and washes the acid-treated nano-carbon material with water. The drying unit 24 dries the washed nano-carbon material.

In the present invention, by pre-treating the fluidized catalyst 12, which also acts as a fluidized material, with the fluidized bed reactor 13, during production of the nano-carbon material the occurrence of the nano-carbon material dense layer is suppressed.

More specifically, by washing the granulated catalyst granulated by the catalyst granulation unit 71 illustrated in FIG. 27 with water in the granulated catalyst surface treatment unit 72, as illustrated in FIG. 28, the active component 101 supported on the primary particles 103A located on the surface side is removed.

Thus, the granulated catalyst according to the present invention is produced by treating the surface of the obtained granulated catalyst so that the ratio of active component present in at least the outermost layer of the granulated catalyst is reduced or zero.

Here, FIG. 28 is a schematic diagram of a granulated catalyst in a pre-treatment state, in which the primary particles have aggregated near the surface. Furthermore, in FIG. 28, the "surface side" is the surface side of the secondary particles, and the "inner side" is the center side of the secondary particles.

Consequently, at the surface side constituting the secondary particles of the granulated catalyst, surface-treated primary particles 103B are present, which inhibit the growth of the nano-carbon material. Furthermore, untreated primary particles 103A are present on the inner side, so that the nano-carbon material grows from the active component in the same manner as conventionally.

Figure 40:
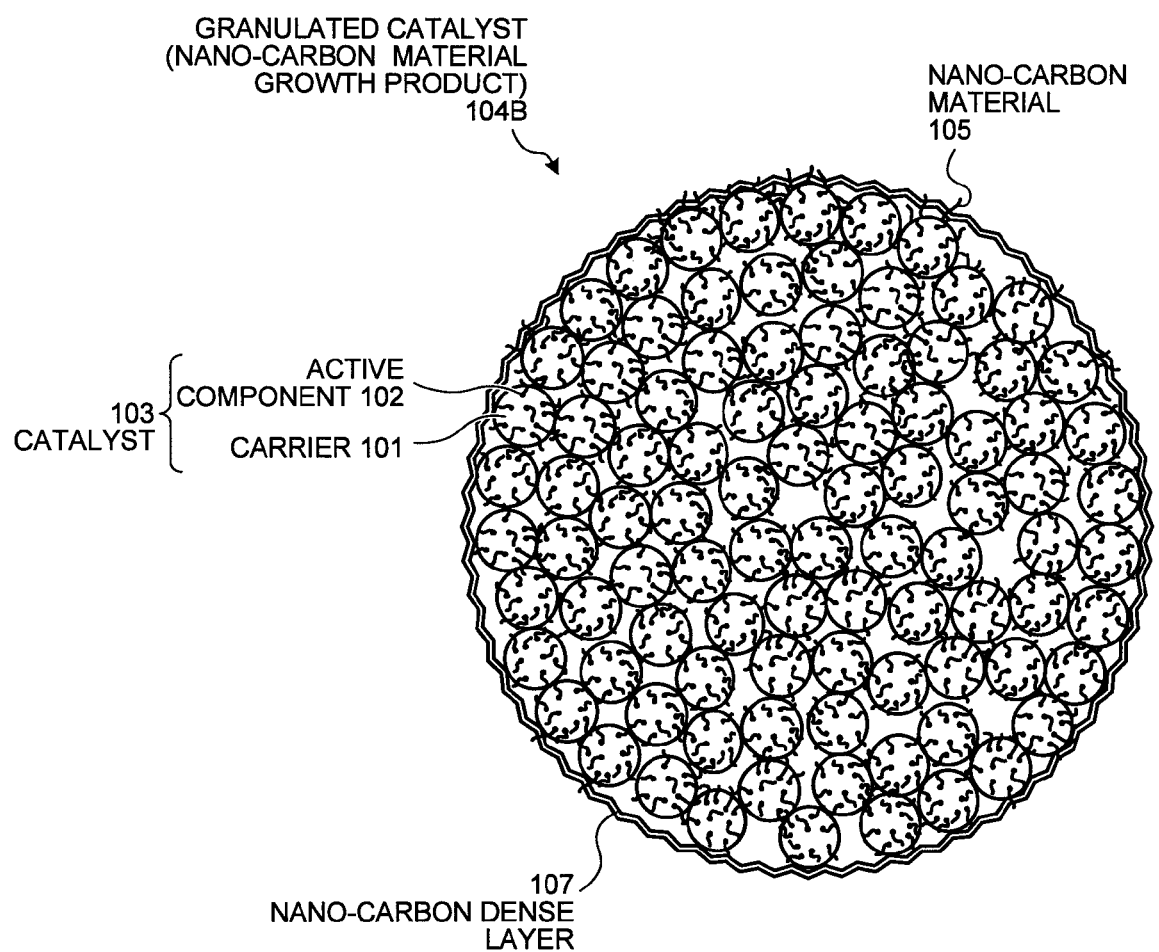
FIG. 40 is a schematic diagram of a catalyst granular material (nano-carbon material growth product).

As a result, formation of the nano-carbon dense layer 107 as illustrated in FIG. 40 around the catalyst granular material 107B is suppressed.

As illustrated in FIG. 29, the washing treatment by the granulated catalyst surface treatment unit 72 is carried out by dipping a wire cage 112, in which secondary particles 100 are placed, in a water tank 110, and cleaning with cleaning water 111 to remove the active component supported on the carrier.

Furthermore, instead of washing with water, a reaction inhibiting substance, such as an alkali metal salt of Na, K and the like (potassium carbonate, sodium carbonate etc.) or an alkaline earth metal salt such as a Mg salt (magnesium carbonate etc.), may be supported on the surface of the primary particles. Other than an alkali metal, an inert substance such as alumina may also be supported.

For example, as illustrated in FIG. 30, during the growth reaction of the nano-carbon from the active metal (Fe), this alkali metal salt and the like undergoes catalytic combustion and gasification, thereby inhibiting the growth of the nano-carbon material (CNT) on the surface side of a secondary particle. Consequently, there is no or very short growth of the nano-carbon material at the primary particles to which the reaction inhibiting substance is adhered. Therefore, the occurrence of the nano-carbon dense layer in the outermost layer of the secondary particles can be suppressed.

Since the catalytic combustion due to the alkali metal proceeds at 450° C. or less, the reaction of the nano-carbon material in the fluidized bed reactor 13 can be at 300 to 450° C.

Furthermore, other than a carrier in a liquid state, the carrier formed from an alkali metal salt of Na, K and the like or an alkaline earth metal salt such as an Mg salt, may also be adhered in a powder state.

Figure 31:
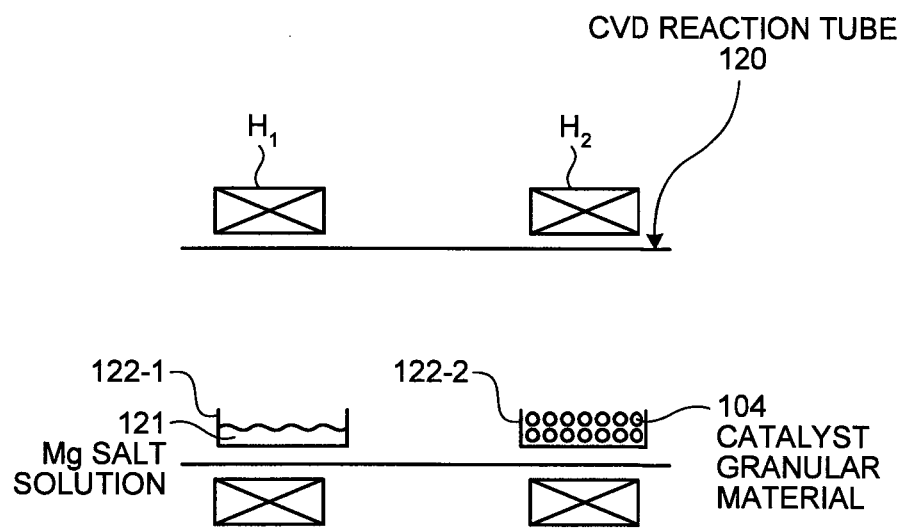
FIG. 31 is a schematic diagram of another surface treatment apparatus for a secondary particle outermost layer.

In addition, as illustrated in FIG. 31, a carrier in a gaseous state using a CVD reaction tube 120 (CVD: chemical vapor deposition) may also be used. In FIG. 31, a boat 122-1 containing an aqueous Na salt solution 121 and a boat 122-2 containing the granulated catalyst 104 are arranged in a CVD reaction tube 120. By carrying out a CVD treatment, the Na salt is vapor-deposited on the surface of the primary particles of the outermost layer constituting the granulated catalyst 104. In FIG. 31, $H_1$ and $H_2$ denote respective heaters for heating the contents of the CVD reaction tube.

The washing treatment and the reaction inhibiting substance supporting treatment may also be carried out together.

The fluidized catalyst 12 is an aggregate or an agglomeration of catalyst primary particles formed from a carrier supporting an active component. The granulated catalyst, which is a secondary particle formed from such catalyst primary particles, has a particle size of 200 μm to 5 mm, preferably 500 μm to 2,000 μm, and more preferably 500 μm to 1,000 μm.

Figure 32:
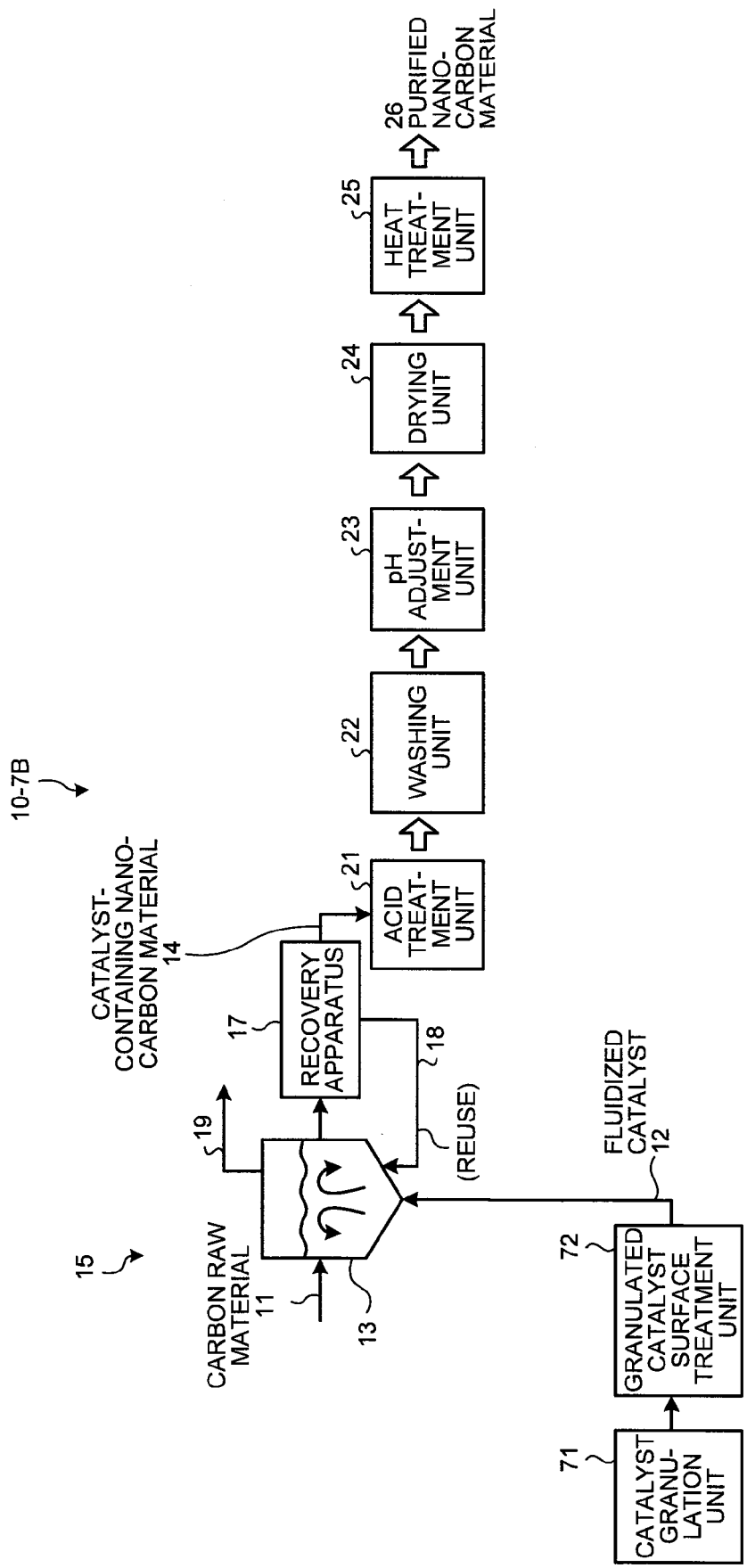
FIG. 32 is a schematic diagram of another nano-carbon material production apparatus according to the seventh embodiment for performing a pre-treatment on a granulated catalyst.

The nano-carbon material production apparatus 10-7B illustrated in FIG. 32 is further provided with the pH adjustment unit 23 described in the first embodiment on the downstream side of the washing unit 22, in the nano-carbon material production apparatus 10-7A illustrated in FIG. 27.

Consequently, due to the combined effects of the treatment for suppressing the occurrence of a nano-carbon dense layer in the outermost layer of the secondary particles during production of the granulated catalyst and the pH adjustment treatment performed after the acid treatment, nano-carbon material entanglement can be suppressed.

Figure 33:
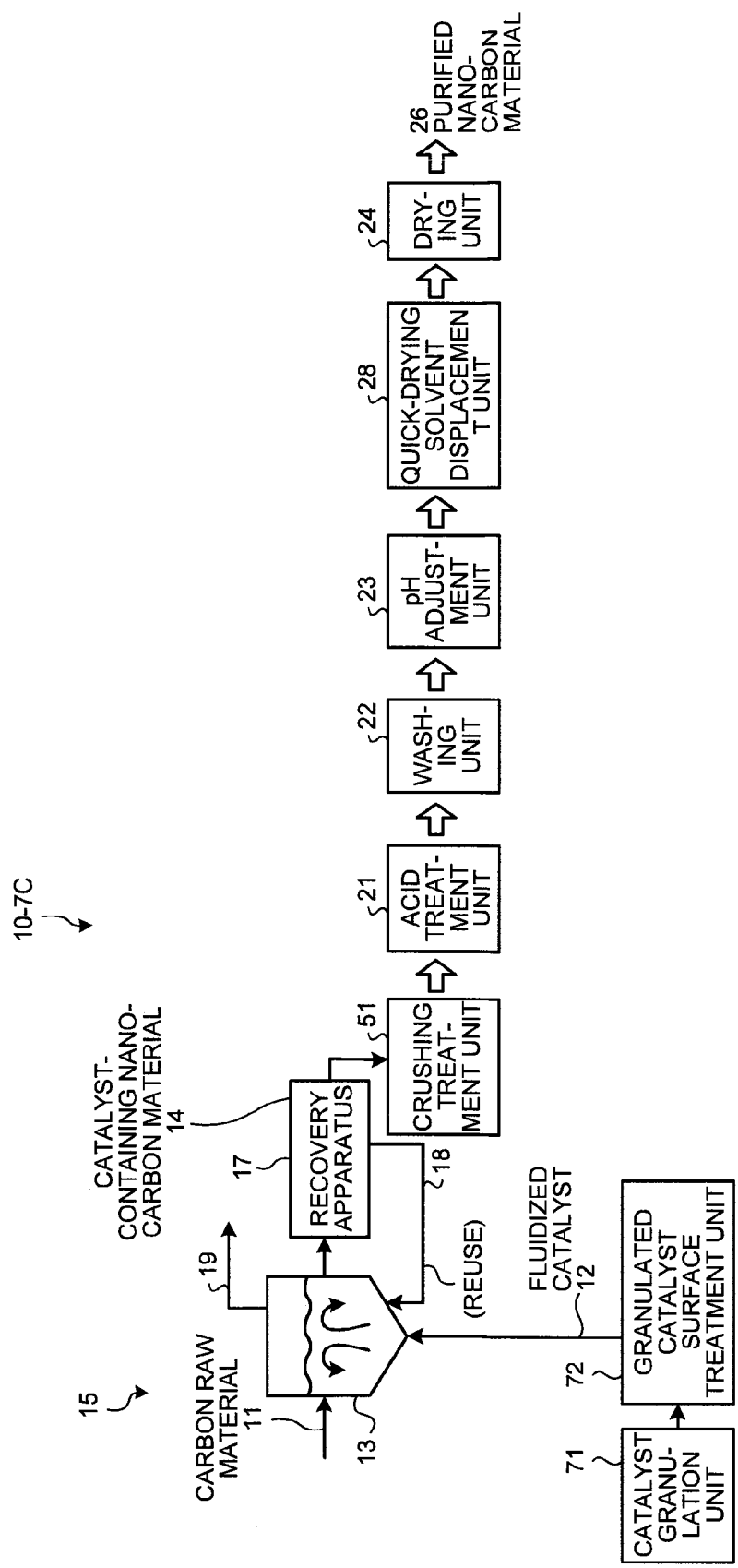
FIG. 33 is a schematic diagram of another nano-carbon material production apparatus according to the seventh embodiment for performing a pre-treatment on a granulated catalyst.

The nano-carbon material production apparatus 10-7C illustrated in FIG. 33 is further provided with a quick-drying solvent displacement unit 28 on the downstream side of the pH adjustment unit 23, in the nano-carbon material production apparatus 10-7B illustrated in FIG. 32.

Consequently, due to the combined effects of the treatment for suppressing the occurrence of a nano-carbon dense layer in the outermost layer of the secondary particles during production of the granulated catalyst, the pH adjustment treatment performed after the acid treatment, and the prevention of agglomeration among the nano-carbon material by displacing with, for example, acetone, which is a quick-drying solvent, so that the drying rate at the subsequent drying unit 24 improves, nano-carbon material entanglement can be suppressed.

Eighth Embodiment

Figure 34:
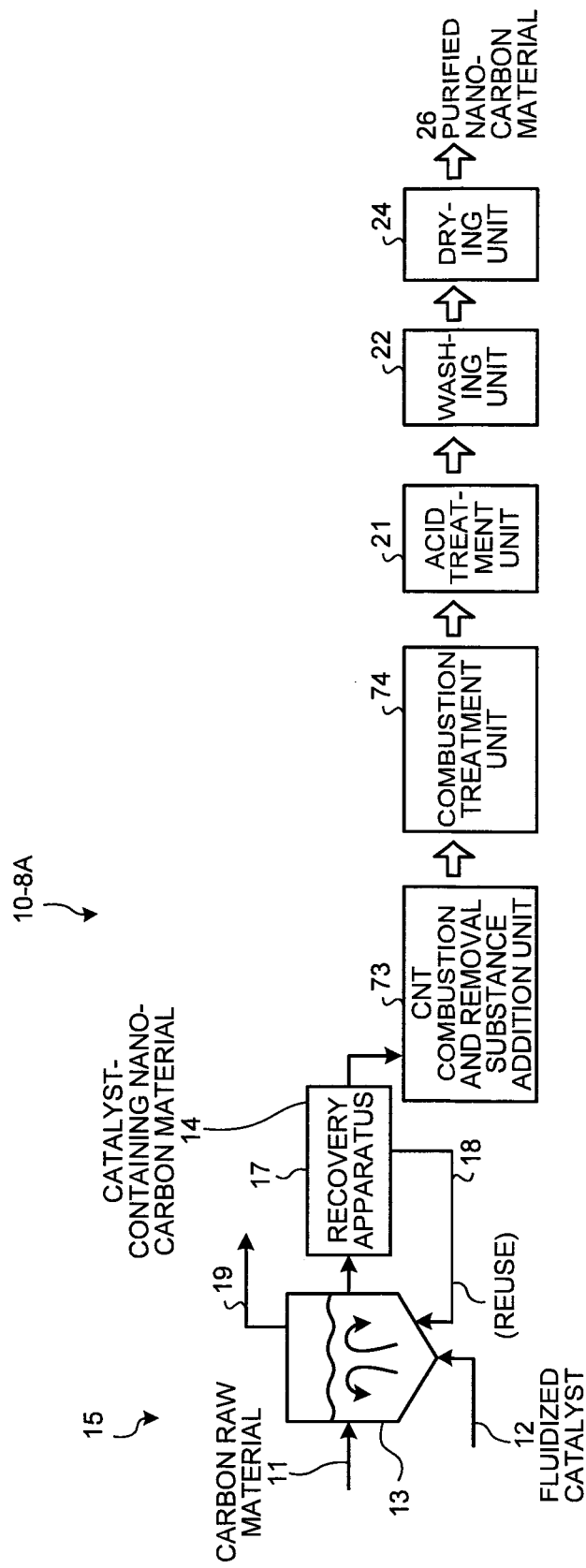
FIG. 34 is a schematic diagram of a nano-carbon material production apparatus according to an eighth embodiment for performing a treatment for adding a substance for combustion and removal of nano-carbon.
Figure 35:
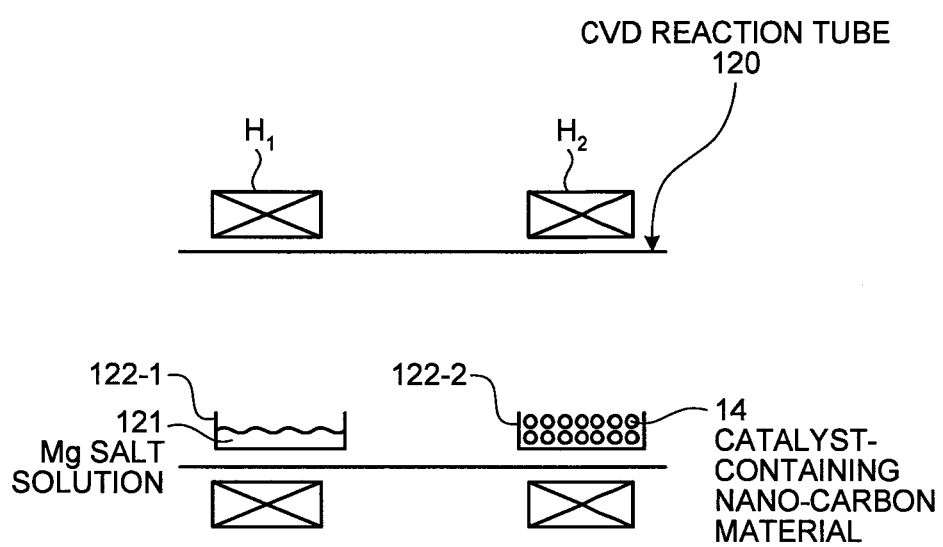
FIG. 35 is a schematic diagram of a CNT eliminating substance addition unit by CVD.

FIG. 34 illustrates a schematic diagram of a nano-carbon material production apparatus according to an eighth embodiment for performing a treatment for adding a substance for combustion and removal of nano-carbon. FIG. 35 is a schematic diagram of a CNT eliminating substance addition unit by CVD.

As illustrated in FIG. 34, a nano-carbon material production apparatus 10-8A according to the present embodiment includes a nano-carbon material production unit 15, a CNT combustion and removal substance addition unit 73, a combustion treatment unit 74, an acid treatment unit 21, a washing unit 22, and a drying unit 24. The nano-carbon material production unit 15 produces a nano-carbon material from a carbon raw material 11 by a fluidized bed reactor 13 using a granulated catalyst formed by granulating a carrier supporting an active component. The CNT combustion and removal substance addition unit 73 adds a substance (CNT combustion and removal substance) for combustion and removal of nano-carbon around a granulated catalyst having a nano-carbon dense layer formed by aggregation of the nano-carbon formed on the surface of a secondary particle formed from aggregation of catalyst primary particles which are the grown nano-carbon material. The combustion treatment unit 74 combusts a nano-carbon dense layer of the surface-treated granulated catalyst. The acid treatment unit 21 dissolves and separates a catalyst by an acid solution by feeding the combusted catalyst-containing nano-carbon material into the acid solution. The washing unit 22 is provided on the downstream side of the acid treatment unit, and washes the acid-treated nano-carbon material with water. The drying unit 24 dries the washed nano-carbon material.

In the present invention, after the catalyst-containing nano-carbon material 14 is produced by the fluidized bed reactor 13, a substance for combustion and removal of nano-carbon is added to the produced nano-carbon dense layer, so that the nano-carbon dense layer is combusted along with the substance for combustion and removal of nano-carbon, thereby eliminating the produced nano-carbon dense layer.

Examples of the substance for combustion and removal of nano-carbon include an alkali metal salt such as a Na or K salt (potassium carbonate, sodium carbonate etc.) and an alkaline earth metal salt such as an Mg salt (magnesium carbonate etc.).

This substance for combustion and removal of nano-carbon may be added by dipping a wire cage, in which the catalyst-containing nano-carbon material 14 has been placed, in a water tank into which an aqueous solution of an alkaline earth metal was charged in advance.

Furthermore, a powder of an alkaline earth metal salt may be added.

This alkaline earth metal salt is present near the surface of the nano-carbon dense layer produced on the surface side of the secondary particles, so that the nano-carbon dense layer is burned off by combustion with oxygen.

It is preferred to perform the combustion in the combustion treatment unit 74 under conditions in the range of 450° C. or less, and more preferably 300 to 450° C.

Furthermore, other than a carrier in a liquid state, the carrier formed from an alkali metal salt such as a Na or K salt or an alkaline earth metal salt such as an Mg salt, may also be adhered in a powder state.

In addition, a carrier in a gaseous state (CVD: chemical vapor deposition) may also be used. As illustrated in FIG. 35, a boat 122-1 containing an aqueous Mg salt solution 121 and a boat 122-2 containing the catalyst-containing nano-carbon material 14 are arranged in a CVD reaction tube 120. By carrying out a CVD treatment, the K salt is vapor-deposited on the surface of the primary particles of the outermost layer constituting the granulated catalyst. In FIG. 35, $H_1$ and $H_2$ denote respective heaters for heating the contents of the CVD reaction tube.

A combustion treated product is obtained by adding the substance for combustion and removal of nano-carbon to the catalyst-containing nano-carbon material 14 by the CNT combustion and removal substance addition unit 73 and then eliminating the nano-carbon material dense layer with the combustion treatment unit 74. This combustion treated product is fed to the acid treatment unit 21, and subjected to an acid treatment.

A heat treatment unit is provided on the downstream side of the drying unit 24 and the heat treatment may be carried out at a high temperature (under a nitrogen atmosphere at 300 to 1,200° C., and more preferably 600 to 900° C., for from 30 minutes to 2 hours, and preferably for about 1 hour). As a result of this high-temperature heat treatment, impurities (for example, sulfate radicals etc. produced by a sulfuric acid treatment) are removed.

According to the present embodiment, by carrying out a treatment for removing a nano-carbon dense layer after the nano-carbon material is produced, a nano-carbon material having little agglomeration can be produced.

Figure 36:
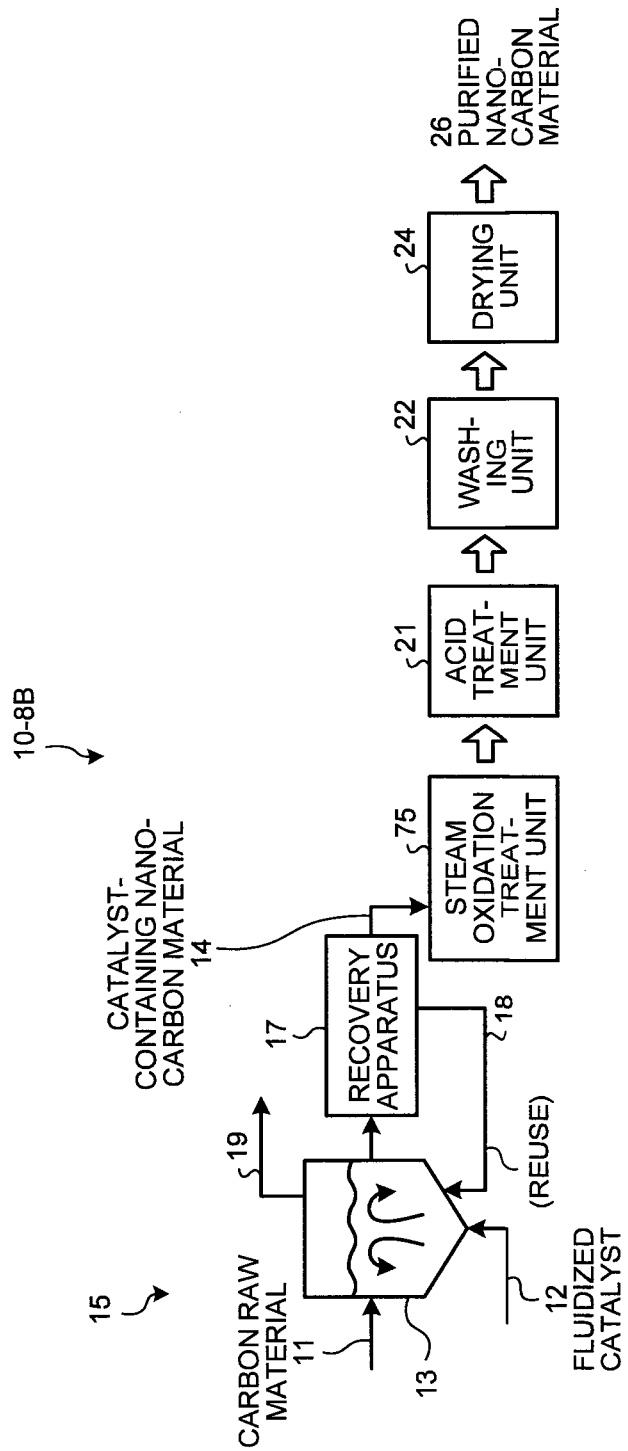
FIG. 36 is a schematic diagram of another nano-carbon material production apparatus according to the eighth embodiment for performing a combustion and removal treatment.

FIG. 36 illustrates a schematic diagram of another nano-carbon material production apparatus according to the eighth embodiment. As illustrated in FIG. 36, a nano-carbon material production apparatus 10-8B according to the present embodiment includes a nano-carbon material production unit 15, a steam oxidation treatment unit 75, an acid treatment unit 21, a washing unit 22, and a drying unit 24. The nano-carbon material production unit 15 produces a nano-carbon material using a granulated catalyst formed by granulating a carrier supporting an active component. The steam oxidation treatment unit 75 performs a steam oxidation treatment on a granulated catalyst having a nano-carbon dense layer formed by aggregation of the nano-carbon formed on the surface of a secondary particle formed from aggregation of catalyst primary particles which are the grown nano-carbon material. The acid treatment unit 21 dissolves and separates a catalyst by an acid solution by feeding the steam-oxidation-treated catalyst-containing nano-carbon material into the acid solution. The washing unit 22 is provided on the downstream side of the acid treatment unit, and washes the acid-treated nano-carbon material with water. The drying unit 24 dries the washed nano-carbon material.

In the present embodiment, instead of the treatment performed in the first embodiment of adding an alkali metal salt and the like, the nano-carbon dense layer formed by aggregation of the nano-carbon formed on the surface of a secondary particle formed from aggregation of catalyst primary particles which are the grown nano-carbon material can be removed by the steam oxidation treatment with the steam oxidation treatment unit 75.

The temperature of the steam is preferably 300 to 600° C., and more preferably 400 to 500° C.

According to the present embodiment, by carrying out a steam oxidation treatment for removing a nano-carbon dense layer after the nano-carbon material is produced, a nano-carbon material having little agglomeration can be produced.

Figure 37:
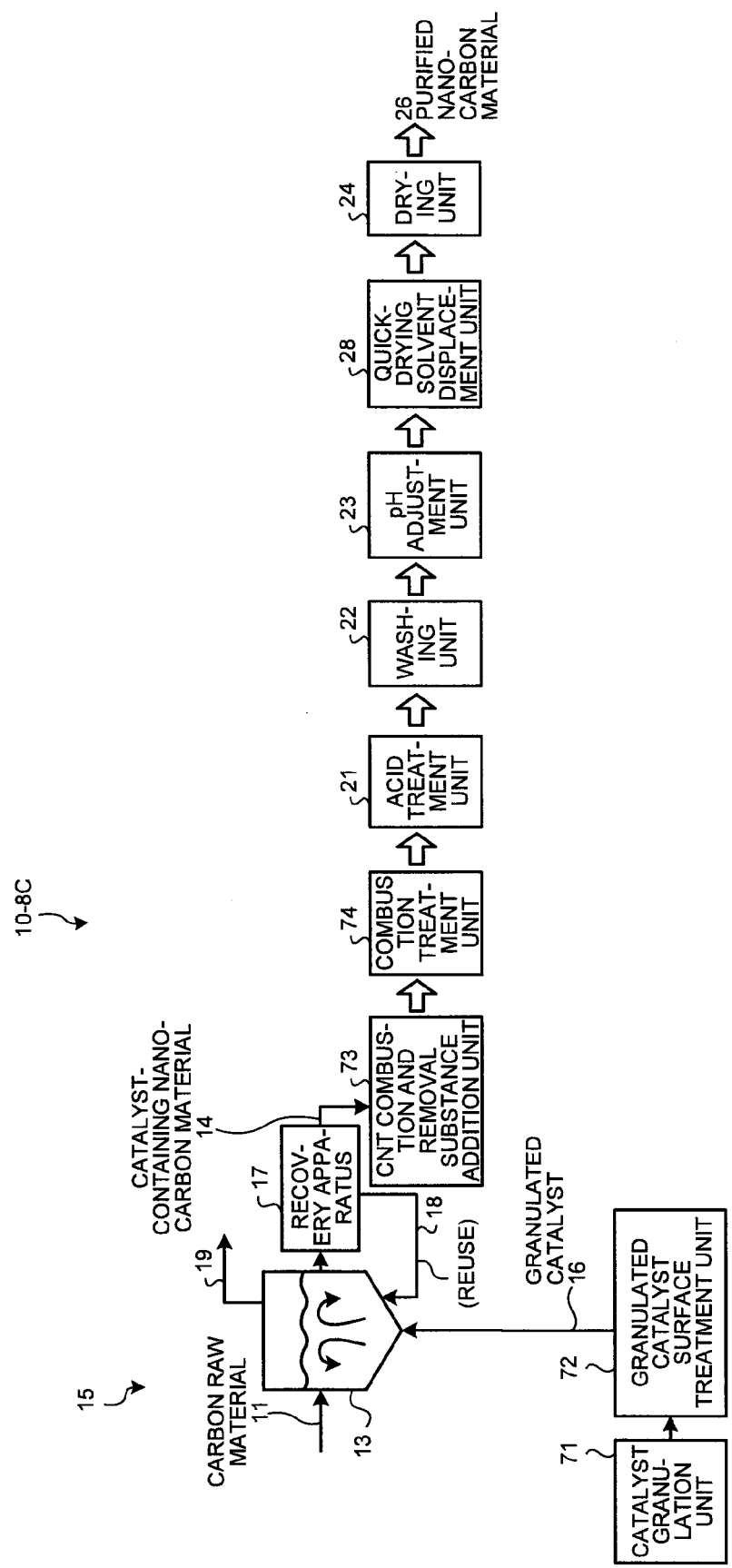
FIG. 37 is a schematic diagram of another nano-carbon material production apparatus according to the eighth embodiment for performing a treatment for adding a substance for combustion and removal of nano-carbon.

Furthermore, the nano-carbon material production apparatus 10-8C illustrated in FIG. 37 not only carries out a pre-treatment on the granulated catalyst by the catalyst granulation unit 71 and the granulated catalyst surface treatment unit 72, but is also further provided on the downstream side of the washing unit 22 with the pH adjustment unit 23 and the quick-drying solvent displacement unit 28, in the nano-carbon material production apparatus 10-8A illustrated in FIG. 34.

Consequently, not only is the nano-carbon dense layer eliminated by the addition in advance of the CNT elimination substance during production of the granulated catalyst, but an elimination treatment is also carried out on the catalyst-containing nano-carbon material. Furthermore, due to the combined effects obtained by performing the pH adjustment treatment with the pH adjustment unit 23 after performing the acid treatment with the acid treatment unit 21 so that the nano-carbons repel each other due to dissociation, and by then displacing with, for example, acetone, which is a quick-drying solvent, with the quick-drying solvent displacement unit 28 so that the drying rate at the subsequent drying unit 24 improves, whereby agglomeration among the nano-carbon material is prevented, nano-carbon material entanglement can be suppressed.

Thus, according to the present invention, agglomeration among a nano-carbon material is prevented by performing an anti-agglomeration treatment for preventing agglomeration among the nano-carbon material due to repulsion among oxygen-containing functional groups added to the nano-carbon material before and/or after performing an acid treatment by dispersing a catalyst-containing nano-carbon material in an acid solution.

The present invention is not limited to the above embodiments. The operation and effects of the present invention can also be enjoyed by further combining the above-described embodiments.

INDUSTRIAL APPLICABILITY

Thus, according to the nano-carbon material production apparatus and method according to the present invention, agglomeration can be suppressed, and nano-carbon material yield can be improved.

The invention claimed is:

1. A method of producing a nano-carbon material, the method comprising:
    forming a catalyst-containing nano-carbon material from a granulated catalyst including an active component supported on a carrier;
    adding oxygen-containing functional groups to the catalyst-containing nano-carbon material, so that the agglomeration of the catalyst-containing nano-carbon material is prevented due to a repulsion among the oxygen-containing functional groups;
    removing the granulated catalyst from the catalyst-containing nano-carbon material by dissolving the catalyst-containing nano-carbon material in an acid solution, and obtaining an acid-treated nano-carbon material;
    washing the acid-treated nano-carbon material with water to obtain a washed nano-carbon material in an aqueous solution;
    adjusting, after the washing, a pH of the aqueous solution to a weakly alkaline side, so that an agglomeration of the washed nano-carbon material is prevented due to an electrostatic repulsion among the oxygen-containing functional groups, at least a part of which has been dissolved in the aqueous solution whose pH is adjusted to the weakly alkaline side; and
    drying the washed nano-carbon material to obtain the nano-carbon material, wherein
    the adding oxygen-containing functional groups to the catalyst-containing nano-carbon material is carried out by a physical treatment and/or a chemical treatment,
    the physical treatment is under an oxygen atmosphere, a heat treatment, a steam oxidation treatment, a plasma treatment, a sputtering treatment, or a discharge treatment and
    the chemical treatment is a polymer grafting treatment or a surfactant treatment.

2. The method for producing a nano-carbon material according to claim 1, further comprising replacing, after the washing and before the drying, the aqueous solution partially with a quick-drying solvent.

3. The method for producing a nano-carbon material according to claim 1, wherein
    a water-soluble dispersion and support agent is added to the acid solution during the removing of the granulated catalyst, the water-soluble dispersion and support agent having both a hydrophobic group and a hydrophilic group, and the water-soluble dispersion and support agent being at least one selected from a resin compound, a polysaccharide, and/or an anti-agglomeration agent, and combinations thereof.

4. The method according to claim 1, wherein the catalyst-containing nano-carbon material is formed by a fluidized bed reactor.

5. The method according to claim 1, wherein
    the granulated catalyst is a secondary particle including a plurality of primary particles, each of the primary particles including the carrier and the active component supported on the carrier,
    an outermost layer of the primary particles forms a surface of the secondary particle, and
    an amount of the active component of the outermost layer of the primary particles is reduced or reduced up to zero by treating the surface of the secondary particle.

6. The method according to claim 1, wherein
    the pH of the aqueous solution is adjusted with ammonia or amines.

7. The method according to claim 5, wherein
    amounts of the active component of inner layers of the primary particles are gradually reduced from the surface of the secondary particle to the inside of the secondary particle.

8. The method according to claim 1, wherein
    the pH of the aqueous solution is adjusted with a chemical, and
    the method further comprises removing, after the drying, the chemical by heating the dried nano-carbon material under a nitrogen atmosphere.

9. The method according to claim 1, wherein
    the catalyst-containing nano-carbon material grown from the active component has a tubular shape.

* * * * *